(12) United States Patent
Taylor et al.

(10) Patent No.: US 8,953,495 B2
(45) Date of Patent: *Feb. 10, 2015

(54) METHODS AND SYSTEMS FOR PROVISIONING LOGICAL CIRCUITS FOR INTERMITTENT USE IN A DATA NETWORK

(71) Applicant: AT&T Intellectual Property I, L.P., Atlanta, GA (US)

(72) Inventors: William Taylor, Duluth, GA (US); David Massengill, Alpharetta, GA (US); John Hollingsworth, Covington, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/202,612

(22) Filed: Mar. 10, 2014

(65) Prior Publication Data

US 2014/0192816 A1  Jul. 10, 2014

Related U.S. Application Data

(63) Continuation of application No. 13/962,684, filed on Aug. 8, 2013, now Pat. No. 8,670,348, which is a continuation of application No. 13/690,861, filed on Nov. 30, 2012, now Pat. No. 8,509,118, which is a continuation of application No. 10/829,539, filed on Apr. 22, 2004, now Pat. No. 8,339,988.

(51) Int. Cl.
*H04L 12/28* (2006.01)
*H04L 12/911* (2013.01)

(52) U.S. Cl.
CPC .................................. *H04L 47/826* (2013.01)
USPC ........................................ 370/254; 370/395.2

(58) Field of Classification Search
None
See application file for complete search history.

(56) References Cited

U.S. PATENT DOCUMENTS

| | | |
|---|---|---|
| 4,905,233 A | 2/1990 | Cain et al. |
| 5,016,244 A | 5/1991 | Massey, Jr. et al. |
| 5,065,392 A | 11/1991 | Sibbitt et al. |
| 5,241,534 A | 8/1993 | Omuro et al. |
| 5,265,092 A | 11/1993 | Soloway et al. |
| 5,375,126 A | 12/1994 | Wallace |

(Continued)

OTHER PUBLICATIONS

United States Patent and Trademark Office, "Notice of Allowance," issued in connection with U.S. Appl. No. 10/745,170, on Dec. 27, 2011 (10 pages).

(Continued)

*Primary Examiner* — Ashley Shivers

(74) *Attorney, Agent, or Firm* — Hanley, Flight and Zimmerman, LLC

(57) ABSTRACT

A customer order is received for routing data for a time period. A logical circuit is provisioned through a first LATA, an IEC, and a second LATA. The logical circuit includes first variable communication paths that automatically reroute from a first set of switches to a second set of switches of the first LATA while maintaining the logical circuit, second variable communication paths to route the data through the second LATA, and fixed communication paths to route the data between the first LATA, the second LATA, and the IEC. The second set of switches forms a route associated with the first variable communication paths that is not predefined and that is dynamically defined at a time of automatic rerouting. The logical circuit is disconnected following the end of the time period.

18 Claims, 7 Drawing Sheets

(56) References Cited

U.S. PATENT DOCUMENTS

| | | |
|---|---|---|
| 5,408,461 A | 4/1995 | Uriu et al. |
| 5,539,817 A | 7/1996 | Wilkes |
| 5,544,170 A | 8/1996 | Kasahara |
| 5,548,639 A | 8/1996 | Ogura et al. |
| 5,559,959 A | 9/1996 | Foglar |
| 5,629,938 A | 5/1997 | Cerciello et al. |
| 5,633,859 A | 5/1997 | Jain et al. |
| 5,650,994 A | 7/1997 | Daley |
| 5,754,527 A | 5/1998 | Fujita |
| 5,764,626 A | 6/1998 | VanDervort |
| 5,774,456 A | 6/1998 | Ellebracht et al. |
| 5,812,528 A | 9/1998 | VanDervort |
| 5,832,197 A | 11/1998 | Houji |
| 5,848,055 A | 12/1998 | Fedyk et al. |
| 5,856,981 A | 1/1999 | Voelker |
| 5,894,475 A | 4/1999 | Bruno et al. |
| 5,926,456 A | 7/1999 | Takano et al. |
| 5,936,939 A | 8/1999 | Des Jardins et al. |
| 6,028,863 A | 2/2000 | Sasagawa et al. |
| 6,038,219 A | 3/2000 | Mawhinney et al. |
| 6,091,951 A | 7/2000 | Sturniolo et al. |
| 6,104,998 A | 8/2000 | Galand et al. |
| 6,108,300 A | 8/2000 | Coile et al. |
| 6,108,307 A | 8/2000 | McConnell et al. |
| 6,118,763 A | 9/2000 | Trumbull |
| 6,144,669 A | 11/2000 | Williams et al. |
| 6,147,998 A | 11/2000 | Kelley et al. |
| 6,167,025 A | 12/2000 | Hsing et al. |
| 6,181,675 B1 | 1/2001 | Miyamoto |
| 6,181,679 B1 | 1/2001 | Ashton et al. |
| 6,185,695 B1 | 2/2001 | Murphy et al. |
| 6,195,416 B1 | 2/2001 | DeCaluwe et al. |
| 6,259,696 B1 | 7/2001 | Yazaki et al. |
| 6,269,401 B1 | 7/2001 | Fletcher et al. |
| 6,311,288 B1 | 10/2001 | Heeren et al. |
| 6,360,260 B1 | 3/2002 | Compliment et al. |
| 6,366,581 B1 | 4/2002 | Jepsen |
| 6,377,548 B1 | 4/2002 | Chuah |
| 6,421,722 B1 | 7/2002 | Bauer et al. |
| 6,424,629 B1 | 7/2002 | Rubino et al. |
| 6,449,259 B1 | 9/2002 | Allain et al. |
| 6,456,306 B1 | 9/2002 | Chin et al. |
| 6,473,398 B1 | 10/2002 | Wall et al. |
| 6,535,990 B1 | 3/2003 | Iterum et al. |
| 6,538,987 B1 | 3/2003 | Cedrone et al. |
| 6,549,533 B1 | 4/2003 | Campbell |
| 6,553,015 B1 | 4/2003 | Sato |
| 6,556,659 B1 | 4/2003 | Bowman-Amuah |
| 6,570,846 B1 | 5/2003 | Ryoo |
| 6,581,166 B1 | 6/2003 | Hirst et al. |
| 6,590,899 B1 | 7/2003 | Thomas et al. |
| 6,594,246 B1 | 7/2003 | Jorgensen |
| 6,594,268 B1 | 7/2003 | Aukia et al. |
| 6,597,689 B1 | 7/2003 | Chiu et al. |
| 6,608,831 B1 | 8/2003 | Beckstrom et al. |
| 6,625,114 B1 | 9/2003 | Hassell |
| 6,643,254 B1 | 11/2003 | Kajitani et al. |
| 6,687,228 B1 | 2/2004 | Fichou et al. |
| 6,697,329 B1 | 2/2004 | McAllister et al. |
| 6,711,125 B1 | 3/2004 | Walrand et al. |
| 6,716,165 B1 | 4/2004 | Flanders et al. |
| 6,738,459 B1 | 5/2004 | Johnstone et al. |
| 6,763,476 B1 | 7/2004 | Dangi et al. |
| 6,766,113 B1 | 7/2004 | Al-Salameh et al. |
| 6,778,525 B1 | 8/2004 | Baum et al. |
| 6,781,952 B2 | 8/2004 | Shirakawa |
| 6,795,393 B1 | 9/2004 | Mazzurco et al. |
| 6,795,394 B1 | 9/2004 | Swinkels et al. |
| 6,810,043 B1 | 10/2004 | Naven et al. |
| 6,823,477 B1 | 11/2004 | Cheng et al. |
| 6,826,184 B1 | 11/2004 | Bryenton et al. |
| 6,829,223 B1 | 12/2004 | Richardson et al. |
| 6,842,513 B1 | 1/2005 | Androski et al. |
| 6,850,483 B1 | 2/2005 | Semaan |
| 6,862,351 B2 | 3/2005 | Taylor |
| 6,865,170 B1 | 3/2005 | Zendle |
| 6,882,652 B1 | 4/2005 | Scholtens et al. |
| 6,885,636 B1 | 4/2005 | Eve |
| 6,885,678 B2 | 4/2005 | Curry et al. |
| 6,925,578 B2 | 8/2005 | Lam et al. |
| 6,952,395 B1 | 10/2005 | Manoharan et al. |
| 6,973,034 B1 | 12/2005 | Natarajan et al. |
| 6,973,037 B1 | 12/2005 | Kahveci |
| 6,978,394 B1 | 12/2005 | Charny et al. |
| 6,981,039 B2 | 12/2005 | Cerami et al. |
| 6,983,401 B2 | 1/2006 | Taylor |
| 6,990,616 B1 | 1/2006 | Botton-Dascal et al. |
| 7,006,443 B2 | 2/2006 | Storr |
| 7,012,898 B1 | 3/2006 | Farris et al. |
| 7,027,053 B2 | 4/2006 | Berndt et al. |
| 7,035,202 B2 | 4/2006 | Callon |
| 7,043,250 B1 | 5/2006 | DeMartino |
| 7,072,331 B2 | 7/2006 | Liu et al. |
| 7,093,155 B2 | 8/2006 | Aoki |
| 7,120,148 B1 | 10/2006 | Batz et al. |
| 7,120,819 B1 | 10/2006 | Gurer et al. |
| 7,146,000 B2 | 12/2006 | Hollman et al. |
| 7,165,192 B1 | 1/2007 | Cadieux et al. |
| 7,184,439 B1 | 2/2007 | Aubuchon et al. |
| 7,200,148 B1 | 4/2007 | Taylor et al. |
| 7,209,452 B2 | 4/2007 | Taylor et al. |
| 7,240,364 B1 | 7/2007 | Branscomb et al. |
| 7,275,192 B2 | 9/2007 | Taylor et al. |
| 7,287,083 B1 | 10/2007 | Nay et al. |
| 7,310,671 B1 | 12/2007 | Hassell et al. |
| 7,350,099 B2 | 3/2008 | Taylor et al. |
| 7,391,734 B2 | 6/2008 | Taylor et al. |
| 7,457,233 B1 | 11/2008 | Gan et al. |
| 7,460,468 B2 | 12/2008 | Taylor et al. |
| 7,466,646 B2 | 12/2008 | Taylor et al. |
| 7,469,282 B2 | 12/2008 | Taylor et al. |
| 7,483,370 B1 | 1/2009 | Dayal et al. |
| 7,496,657 B2 | 2/2009 | Menon |
| 7,609,623 B2 | 10/2009 | Taylor et al. |
| 7,630,302 B2 | 12/2009 | Taylor et al. |
| 7,639,606 B2 | 12/2009 | Taylor et al. |
| 7,639,623 B2 | 12/2009 | Taylor et al. |
| 7,646,707 B2 | 1/2010 | Taylor et al. |
| 7,680,928 B2 | 3/2010 | Lean et al. |
| 7,768,904 B2 | 8/2010 | Taylor et al. |
| 8,031,588 B2 | 10/2011 | Taylor et al. |
| 8,031,620 B2 | 10/2011 | Taylor et al. |
| 8,199,638 B2 | 6/2012 | Taylor et al. |
| 8,200,802 B2 | 6/2012 | Taylor et al. |
| 8,203,933 B2 | 6/2012 | Taylor et al. |
| 8,223,632 B2 | 7/2012 | Taylor et al. |
| 8,243,592 B2 | 8/2012 | Taylor et al. |
| 8,339,938 B2 | 12/2012 | Taylor et al. |
| 8,339,988 B2 | 12/2012 | Taylor et al. |
| 8,345,537 B2 | 1/2013 | Taylor et al. |
| 8,345,543 B2 | 1/2013 | Taylor et al. |
| 8,509,058 B2 | 8/2013 | Taylor et al. |
| 8,509,118 B2 | 8/2013 | Taylor et al. |
| 8,547,830 B2 | 10/2013 | Taylor et al. |
| 8,547,831 B2 | 10/2013 | Taylor et al. |
| 8,565,074 B2 | 10/2013 | Taylor et al. |
| 8,665,705 B2 | 3/2014 | Taylor et al. |
| 8,670,348 B2 | 3/2014 | Taylor et al. |
| 8,711,679 B2 | 4/2014 | Taylor et al. |
| 8,730,795 B2 | 5/2014 | Taylor et al. |
| 8,737,196 B2 | 5/2014 | Taylor et al. |
| 8,750,102 B2 | 6/2014 | Taylor et al. |
| 2001/0000700 A1 | 5/2001 | Eslambolchi et al. |
| 2001/0010681 A1 | 8/2001 | McAllister et al. |
| 2002/0001307 A1 | 1/2002 | Nguyen et al. |
| 2002/0067698 A1 | 6/2002 | Gourley et al. |
| 2002/0072358 A1 | 6/2002 | Schneider et al. |
| 2002/0089985 A1 | 7/2002 | Wahl et al. |
| 2002/0112072 A1 | 8/2002 | Jain |
| 2002/0131362 A1 | 9/2002 | Callon |
| 2002/0172148 A1 | 11/2002 | Kim et al. |
| 2002/0181402 A1 | 12/2002 | Lemoff et al. |
| 2002/0186653 A1 | 12/2002 | Jensen |
| 2003/0043753 A1 | 3/2003 | Nelson et al. |

(56) References Cited

U.S. PATENT DOCUMENTS

| | | | |
|---|---|---|---|
| 2003/0051049 A1 | 3/2003 | Noy et al. |
| 2003/0051195 A1 | 3/2003 | Bosa et al. |
| 2003/0086413 A1 | 5/2003 | Tartarelli et al. |
| 2003/0091024 A1 | 5/2003 | Stumer |
| 2003/0092390 A1 | 5/2003 | Haumont |
| 2003/0117951 A1 | 6/2003 | Wiebe et al. |
| 2003/0128692 A1 | 7/2003 | Mitsumori et al. |
| 2003/0152028 A1 | 8/2003 | Raisanen et al. |
| 2003/0185151 A1 | 10/2003 | Kurosawa et al. |
| 2004/0090918 A1 | 5/2004 | McLendon |
| 2004/0090973 A1 | 5/2004 | Christie et al. |
| 2004/0125776 A1 | 7/2004 | Haugli et al. |
| 2004/0141464 A1 | 7/2004 | Taylor et al. |
| 2004/0172574 A1 | 9/2004 | Wing et al. |
| 2004/0202112 A1 | 10/2004 | McAllister et al. |
| 2005/0002339 A1 | 1/2005 | Patil et al. |
| 2005/0013242 A1 | 1/2005 | Chen et al. |
| 2005/0135237 A1 | 6/2005 | Taylor et al. |
| 2005/0135238 A1 | 6/2005 | Taylor et al. |
| 2005/0135254 A1 | 6/2005 | Taylor et al. |
| 2005/0135263 A1 | 6/2005 | Taylor et al. |
| 2005/0138203 A1 | 6/2005 | Taylor et al. |
| 2005/0138476 A1 | 6/2005 | Taylor et al. |
| 2005/0152028 A1 | 7/2005 | Mitzkus |
| 2005/0172160 A1 | 8/2005 | Taylor et al. |
| 2005/0172174 A1 | 8/2005 | Taylor et al. |
| 2005/0237925 A1 | 10/2005 | Taylor et al. |
| 2005/0238006 A1 | 10/2005 | Taylor et al. |
| 2005/0238007 A1 | 10/2005 | Taylor et al. |
| 2005/0238024 A1 | 10/2005 | Taylor et al. |
| 2005/0240840 A1 | 10/2005 | Taylor et al. |
| 2005/0276216 A1 | 12/2005 | Vasseur et al. |
| 2006/0013210 A1 | 1/2006 | Bordogna et al. |
| 2006/0146700 A1 | 7/2006 | Taylor et al. |
| 2006/0153066 A1 | 7/2006 | Saleh et al. |
| 2007/0050492 A1 | 3/2007 | Jorgensen |
| 2007/0168200 A1 | 7/2007 | Shimizu |
| 2009/0041012 A1 | 2/2009 | Taylor et al. |
| 2009/0086626 A1 | 4/2009 | Taylor et al. |
| 2009/0103544 A1 | 4/2009 | Taylor et al. |
| 2009/0323534 A1 | 12/2009 | Taylor et al. |
| 2010/0020677 A1 | 1/2010 | Taylor et al. |
| 2010/0046366 A1 | 2/2010 | Taylor et al. |
| 2010/0046380 A1 | 2/2010 | Taylor et al. |
| 2010/0054122 A1 | 3/2010 | Taylor et al. |
| 2012/0224475 A1 | 9/2012 | Taylor et al. |
| 2012/0266015 A1 | 10/2012 | Taylor et al. |
| 2012/0275299 A1 | 11/2012 | Taylor et al. |
| 2013/0091377 A1 | 4/2013 | Taylor et al. |
| 2013/0091378 A1 | 4/2013 | Taylor et al. |
| 2013/0094354 A1 | 4/2013 | Taylor et al. |
| 2013/0156042 A1 | 6/2013 | Taylor et al. |
| 2013/0326262 A1 | 12/2013 | Taylor et al. |
| 2014/0025988 A1 | 1/2014 | Taylor et al. |
| 2014/0029409 A1 | 1/2014 | Taylor et al. |
| 2014/0029417 A1 | 1/2014 | Taylor et al. |

OTHER PUBLICATIONS

United States Patent and Trademark Office, "Notice of Panel Decision from Pre-Appeal Brief Review," issued in connection with U.S. Appl. No. 10/745,170, on Apr. 26, 2011 (2 pages).

United States Patent and Trademark Office, "Final Office Action," issued in connection with U.S. Appl. No. 10/745,170, on Oct. 26, 2010 (24 pages).

United States Patent and Trademark Office, "Non-Final Office Action," issued in connection with U.S. Appl. No. 10/745,170, on Mar. 30, 2010 (24 pages).

United States Patent and Trademark Office, "Non-Final Office Action," issued in connection with U.S. Appl. No. 10/745,170, on Oct. 14, 2009 (23 pages).

United States Patent and Trademark Office, "Final Office Action," issued in connection with U.S. Appl. No. 10/745,170, on Apr. 28, 2009 (21 pages).

United States Patent and Trademark Office, "Non-Final Office Action," issued in connection with U.S. Appl. No. 10/745,170, on Nov. 14, 2008 (21 pages).

United States Patent and Trademark Office, "Advisory Action," issued in connection with U.S. Appl. No. 10/745,170, on Oct. 21, 2008 (3 pages).

United States Patent and Trademark Office, "Final Office Action," issued in connection with U.S. Appl. No. 10/745,170, on Apr. 17, 2008 (14 pages).

United States Patent and Trademark Office, "Non-Final Office Action," issued in connection with U.S. Appl. No. 10/745,170, on Jul. 20, 2007 (14 pages).

United States Patent and Trademark Office, "Final Office Action," issued in connection with U.S. Appl. No. 10/829,495, on Mar. 23, 2009 (26 pages).

United States Patent and Trademark Office, "Non-Final Office Action," issued in connection with U.S. Appl. No. 10/829,495, on Oct. 29, 2008 (25 pages).

United States Patent and Trademark Office, "Final Office Action," issued in connection with U.S. Appl. No. 10/829,495, on Jun. 11, 2008 (22 pages).

United States Patent and Trademark Office, "Non-Final Office Action," issued in connection with U.S. Appl. No. 10/829,495, on Sep. 7, 2007 (24 pages).

United States Patent and Trademark Office, "Advisory Action," issued in connection with U.S. Appl. No. 10/829,495, on Jun. 4, 2009 (3 pages).

United States Patent and Trademark Office, "Non-Final Office Action," issued in connection with U.S. Appl. No. 10/829,495, on Oct. 1, 2009 (28 pages).

United States Patent and Trademark Office, "Notice of Allowance," issued in connection with U.S. Appl. No. 10/829,495, on Apr. 29, 2010 (7 pages).

United States Patent and Trademark Office, "Interview Summary," issued in connection with U.S. Appl. No. 10/829,509, on Sep. 20, 2006 (4 pages).

United States Patent and Trademark Office, "Notice of Allowance," issued in connection with U.S. Appl. No. 10/829,509, on Jul. 10, 2007 (7 pages).

United States Patent and Trademark Office, "Notice of Allowance," issued in connection with U.S. Appl. No. 10/829,509, on Feb. 1, 2007 (8 pages).

United States Patent and Trademark Office, "Final Office Action," issued in connection with U.S. Appl. No. 10/829,509, on Nov. 13, 2006 (12 pages).

United States Patent and Trademark Office, "Non-Final Office Action," issued in connection with U.S. Appl. No. 10/829,509, on May 15, 2006 (11 pages).

United States Patent and Trademark Office, "Final Office Action," issued in connection with U.S. Appl. No. 10/829,539, on Mar. 13, 2009 (29 pages).

United States Patent and Trademark Office, "Non-Final Office Action," issued in connection with U.S. Appl. No. 10/829,539, on Nov. 25, 2008 (23 pages).

United States Patent and Trademark Office, "Final Office Action," issued in connection with U.S. Appl. No. 10/829,539, on Aug. 20, 2008 (29 pages).

United States Patent and Trademark Office, "Interview Summary," issued in connection with U.S. Appl. No. 10/829,539, on Apr. 28, 2008 (2 pages).

United States Patent and Trademark Office, "Non-Final Office Action," issued in connection with U.S. Appl. No. 10/829,539, on Oct. 17, 2007 (19 pages).

United States Patent and Trademark Office, "Advisory Action," issued in connection with U.S. Appl. No. 10/829,539, on Jun. 12, 2009 (3 pages).

United States Patent and Trademark Office, "Non-Final Office Action," issued in connection with U.S. Appl. No. 10/829,539, on Aug. 25, 2009 (41 pages).

United States Patent and Trademark Office, "Non-Final Office Action," issued in connection with U.S. Appl. No. 10/829,539, on Apr. 27, 2010 (32 pages).

(56) References Cited

OTHER PUBLICATIONS

United States Patent and Trademark Office, "Final Office Action," issued in connection with U.S. Appl. No. 10/829,539, on Sep. 23, 2010 (32 pages).
United States Patent and Trademark Office, "Non-Final Office Action," issued in connection with U.S. Appl. No. 10/829,539, on Mar. 22, 2011 (35 pages).
United States Patent and Trademark Office, "Final Office Action," issued in connection with U.S. Appl. No. 10/829,539, on Sep. 29, 2011 (37 pages).
United States Patent and Trademark Office, "Non-Final Office Action," issued in connection with U.S. Appl. No. 10/829,539, on Jan. 30, 2012 (37 pages).
United States Patent and Trademark Office, "Notice of Allowance," issued in connection with U.S. Appl. No. 10/829,539, on Aug. 16, 2012 (13 pages).
United States Patent and Trademark Office, "Office Communication—No Action Count," issued in connection with U.S. Appl. No. 10/829,584, on Oct. 16, 2008 (4 pages).
United States Patent and Trademark Office, "Notice of Allowance," issued in connection with U.S. Appl. No. 10/829,584, on Sep. 22, 2008 (7 pages).
United States Patent and Trademark Office, "Final Office Action," issued in connection with U.S. Appl. No. 10/829,584, on Jun. 25, 2008 (20 pages).
United States Patent and Trademark Office, "Non-Final Office Action," issued in connection with U.S. Appl. No. 10/829,584, on Sep. 19, 2007 (15 pages).
United States Patent and Trademark Office, "Supplemental Notice of Allowance," issued in connection with U.S. Appl. No. 10/829,795, on Nov. 13, 2008 (2 pages).
United States Patent and Trademark Office, "Notice of Allowance," issued in connection with U.S. Appl. No. 10/829,795, on Sep. 9, 2008 (7 pages).
United States Patent and Trademark Office, "Final Office Action," issued in connection with U.S. Appl. No. 10/829,795, on Apr. 30, 2008 (20 pages).
United States Patent and Trademark Office, "Non-Final Office Action," issued in connection with U.S. Appl. No. 10/829,795, on Sep. 10, 2007 (21 pages).
United States Patent and Trademark Office, "Interview Summary," issued in connection with U.S. Appl. No. 10/829,795, on Aug. 1, 2008 (2 pages).
United States Patent and Trademark Office, "Non-Final Office Action," issued in connection with U.S. Appl. No. 12/254,233, on Apr. 15, 2010 (24 pages).
United States Patent and Trademark Office, "Final Office Action," issued in connection with U.S. Appl. No. 12/254,233, on Sep. 29, 2010 (26 pages).
United States Patent and Trademark Office, "Non-Final Office Action," issued in connection with U.S. Appl. No. 12/254,233, on Mar. 25, 2011 (28 pages).
United States Patent and Trademark Office, "Final Office Action," issued in connection with U.S. Appl. No. 12/254,233, on Oct. 3, 2011 (29 pages).
United States Patent and Trademark Office, "Non-Final Office Action," issued in connection with U.S. Appl. No. 12/254,233, on Jan. 30, 2012 (29 pages).
United States Patent and Trademark Office, "Notice of Allowance," issued in connection with U.S. Appl. No. 12/254,233, on Aug. 16, 2012 (19 pages).
United States Patent and Trademark Office, "Non-Final Office Action," issued in connection with U.S. Appl. No. 12/334,248, on Apr. 13, 2010 (23 pages).
United States Patent and Trademark Office, "Final Office Action," issued in connection with U.S. Appl. No. 12/334,248, on Sep. 29, 2010 (25 pages).
United States Patent and Trademark Office, "Non-Final Office Action," issued in connection with U.S. Appl. No. 12/334,248, on Mar. 25, 2011 (28 pages).
United States Patent and Trademark Office, "Final Office Action," issued in connection with U.S. Appl. No. 12/334,248, on Oct. 3, 2011 (29 pages).
United States Patent and Trademark Office, "Non-Final Office Action," issued in connection with U.S. Appl. No. 12/334,248, on Jan. 30, 2012 (29 pages).
United States Patent and Trademark Office, "Notice of Allowance," issued in connection with U.S. Appl. No. 12/334,248, on Aug. 22, 2012 (16 pages).
United States Patent and Trademark Office, "Non-Final Office Action," issued in connection with U.S. Appl. No. 12/339,426, on Mar. 8, 2010 (6 pages).
United States Patent and Trademark Office, "Notice of Allowance," issued in connection with U.S. Appl. No. 12/339,426, on Nov. 8, 2010 (9 pages).
United States Patent and Trademark Office, "Non-Final Office Action," issued in connection with U.S. Appl. No. 12/551,477, on Nov. 16, 2010 (15 pages).
United States Patent and Trademark Office, "Final Office Action," issued in connection with U.S. Appl. No. 12/551,477, on Jul. 11, 2011 (13 pages).
United States Patent and Trademark Office, "Notice of Allowance," issued in connection with U.S. Appl. No. 12/551,477, on Mar. 1, 2012 (8 pages).
United States Patent and Trademark Office, "Notice of Panel Decision from Pre-Appeal Brief Review," issued in connection with U.S. Appl. No. 12/551,477, on Jan. 13, 2012 (2 pages).
United States Patent and Trademark Office, "Non-Final Office Action," issued in connection with U.S. Appl. No. 12/570,938, on Oct. 7, 2010 (19 pages).
United States Patent and Trademark Office, "Notice of Allowance," issued in connection with U.S. Appl. No. 12/570,938, on Jun. 20, 2011 (14 pages).
United States Patent and Trademark Office, "Non-Final Office Action," issued in connection with U.S. Appl. No. 12/609,415, on Dec. 9, 2010 (12 pages).
United States Patent and Trademark Office, "Non-Final Office Action," issued in connection with U.S. Appl. No. 12/609,415, on Jun. 23, 2011 (12 pages).
United States Patent and Trademark Office, "Final Office Action," issued in connection with U.S. Appl. No. 12/609,415, on Mar. 7, 2012 (12 pages).
United States Patent and Trademark Office, "Notice of Allowance," issued in connection with U.S. Appl. No. 12/609,415, on Aug. 22, 2012 (17 pages).
United States Patent and Trademark Office, "Non-Final Office Action," issued in connection with U.S. Appl. No. 12/609,640, on Dec. 9, 2010 (11 pages).
United States Patent and Trademark Office, "Non-Final Office Action," issued in connection with U.S. Appl. No. 12/609,683, on Oct. 25, 2010 (15 pages).
United States Patent and Trademark Office, "Notice of Allowance," issued in connection with U.S. Appl. No. 12/609,683, on Jul. 12, 2011 (24 pages).
United States Patent and Trademark Office, "Notice of Allowance," issued in connection with U.S. Appl. No. 12/967,930, on Jan. 30, 2012 (13 pages).
United States Patent and Trademark Office, "Non-Final Office Action," issued in connection with U.S. Appl. No. 13/472,244, on Jan. 22, 2013 (18 pages).
United States Patent and Trademark Office, "Final Office Action," issued in connection with U.S. Appl. No. 13/472,244, on Aug. 13, 2013 (11 pages).
United States Patent and Trademark Office, "Non-Final Office Action," issued in connection with U.S. Appl. No. 12/967,930, on Apr. 29, 2011 (6 pages).
United States Patent and Trademark Office, "Notice of Allowance," issued in connection with U.S. Appl. No. 13/472,244, on Nov. 26, 2013 (7 pages).
United States Patent and Trademark Office, "Non-Final Office Action," issued in connection with U.S. Appl. No. 13/475,577, on Mar. 15, 2013 (10 pages).

(56) References Cited

OTHER PUBLICATIONS

United States Patent and Trademark Office, "Final Office Action," issued in connection with U.S. Appl. No. 13/475,577, on Oct. 9, 2013 (9 pages).
United States Patent and Trademark Office, "Notice of Allowance," issued in connection with U.S. Appl. No. 13/475,577, on Jan. 23, 2014 (9 pages).
United States Patent and Trademark Office, "Non-Final Office Action," issued in connection with U.S. Appl. No. 13/547,474, on Nov. 2, 2012 (8 pages).
United States Patent and Trademark Office, "Notice of Allowance," issued in connection with U.S. Appl. No. 13/547,474, on May 29, 2013 (10 pages).
United States Patent and Trademark Office, "Notice of Allowance," issued in connection with U.S. Appl. No. 13/690,777, on May 14, 2013 (10 pages).
United States Patent and Trademark Office, "Notice of Allowance," issued in connection with U.S. Appl. No. 13/690,839, on Apr. 30, 2013 (11 pages).
United States Patent and Trademark Office, "Notice of Allowance," issued in connection with U.S. Appl. No. 13/690,861, on Apr. 12, 2013 (10 pages).
United States Patent and Trademark Office, "Notice of Allowance," issued in connection with U.S. Appl. No. 13/690,884, on Mar. 29, 2013 (10 pages).
United States Patent and Trademark Office, "Notice of Allowance," issued in connection with U.S. Appl. No. 13/962,655, on Oct. 10, 2013 (13 pages).
United States Patent and Trademark Office, "Notice of Allowance," issued in connection with U.S. Appl. No. 13/962,684, on Oct. 9, 2013 (11 pages).
United States Patent and Trademark Office, "Notice of Allowance," issued in connection with U.S. Appl. No. 14/038,187, on Jan. 7, 2014 (8 pages).
United States Patent and Trademark Office, "Notice of Allowance," issued in connection with U.S. Appl. No. 14/040,054, on Jan. 14, 2014 (11 pages).
Don Ryan, The Telco Handbook for New Technicians—An Introduction to Telco Technology and Troubleshooting, Oct. 27, 2000, [retrieved from http://www.darkwing.net/aaron/telco.doc, accessed on Nov. 11, 2006], 67 pages.
Chen, Thomas M. and Liu, Steve S., Management and Control Functions in ATM Switching Systems, IEEE Network, Jul./Aug. 1994 (7 pages).
Meserole, Thomas A. and Prasad, Anil Customer Network Management (CMN) for ATM Public Network Service (M3 Specification), af-nm-0019.000, Rev. 1.04, Oct. 1994 (13 pages).
Mangan, Tim, OA&M: How a Frame Relay SLA is Measured and Diagnosed, http://www.mfaforum.org/frame/Whitepaper/whitepapers/OAMwhitepaper.shtml, Apr. 2001, (4 pages).
United States Patent and Trademark Office, "Non-Final Office Action," issued in connection with U.S. Appl. No. 10/348,077, on Jan. 4, 2007 (15 pages).
United States Patent and Trademark Office, "Interview Summary," issued in connection with U.S. Appl. No. 10/348,077, on May 11, 2007 (2 pages).
United States Patent and Trademark Office, "Final Office Action," issued in connection with U.S. Appl. No. 10/348,077, on Aug. 10, 2007 (26 pages).
United States Patent and Trademark Office, "Notice of Allowance," issued in connection with U.S. Appl. No. 10/348,077, on Apr. 29, 2008 (10 pages).
United States Patent and Trademark Office, "Notice of Allowance," issued in connection with U.S. Appl. No. 10/348,592, on Oct. 14, 2008 (4 pages).
United States Patent and Trademark Office, "Final Office Action," issued in connection with U.S. Appl. No. 10/348,592, on Mar. 21, 2008 (11 pages).
United States Patent and Trademark Office, "Non-Final Office Action," issued in connection with U.S. Appl. No. 10/348,592, on Jun. 14, 2007 (10 pages).
United States Patent and Trademark Office, "Non-Final Office Action," issued in connection with U.S. Appl. No. 10/348,592, on Sep. 8, 2006 (7 pages).
United States Patent and Trademark Office, "Notice of Allowance," issued in connection with U.S. Appl. No. 10/744,281, on Oct. 30, 2007 (8 pages).
United States Patent and Trademark Office, "Notice of Allowance," issued in connection with U.S. Appl. No. 10/744,281, on Aug. 27, 2007 (6 pages).
United States Patent and Trademark Office, "Interview Summary," issued in connection with U.S. Appl. No. 10/744,281, on Aug. 6, 2007 (3 pages).
United States Patent and Trademark Office, "Final Office Action," issued in connection with U.S. Appl. No. 10/744,281, on Apr. 17, 2007 (18 pages).
United States Patent and Trademark Office, "Interview Summary," issued in connection with U.S. Appl. No. 10/744,281, on Nov. 27, 2006 (3 pages).
United States Patent and Trademark Office, "Non-Final Office Action," issued in connection with U.S. Appl. No. 10/744,281, on Oct. 2, 2006 (16 pages).
United States Patent and Trademark Office, "Notice of Allowance," issued in connection with U.S. Appl. No. 10/744,283, on Sep. 18, 2009 (11 pages).
United States Patent and Trademark Office, "Non-Final Office Action," issued in connection with U.S. Appl. No. 10/744,283, on Apr. 14, 2009 (13 pages).
United States Patent and Trademark Office, "Non-Final Office Action," issued in connection with U.S. Appl. No. 10/744,283, on Oct. 30, 2008 (13 pages).
United States Patent and Trademark Office, "Final Office Action," issued in connection with U.S. Appl. No. 10/744,283, on Apr. 17, 2008 (11 pages).
United States Patent and Trademark Office, "Non-Final Office Action," issued in connection with U.S. Appl. No. 10/744,283, on Jul. 20, 2007 (12 pages).
United States Patent and Trademark Office, "Notice of Allowance," issued in connection with U.S. Appl. No. 10/744,555, on Jun. 7, 2012 (13 pages).
United States Patent and Trademark Office, "Notice of Allowance," issued in connection with U.S. Appl. No. 10/744,555, on Feb. 6, 2012 (8 pages).
United States Patent and Trademark Office, "Non-Final Office Action," issued in connection with U.S. Appl. No. 10/744,555, on Apr. 14, 2011 (19 pages).
United States Patent and Trademark Office, "Final Office Action," issued in connection with U.S. Appl. No. 10/744,555, on Oct. 7, 2010 (26 pages).
United States Patent and Trademark Office, "Non-Final Office Action," issued in connection with U.S. Appl. No. 10/744,555, on Feb. 1, 2010 (26 pages).
United States Patent and Trademark Office, "Final Office Action," issued in connection with U.S. Appl. No. 10/744,555, on Jul. 17, 2009 (27 pages).
United States Patent and Trademark Office, "Non-Final Office Action," issued in connection with U.S. Appl. No. 10/744,555, on Jan. 14, 2009 (37 pages).
United States Patent and Trademark Office, "Final Office Action," issued in connection with U.S. Appl. No. 10/744,555, on May 12, 2008 (34 pages).
United States Patent and Trademark Office, "Non-Final Office Action," issued in connection with U.S. Appl. No. 10/744,555, on Aug. 6, 2007 (18 pages).
United States Patent and Trademark Office, "Final Office Action," issued in connection with U.S. Appl. No. 10/744,921, on Apr. 6, 2009 (23 pages).
United States Patent and Trademark Office, "Non-Final Office Action," issued in connection with U.S. Appl. No. 10/744,921, on Oct. 31, 2008 (23 pages).

(56) References Cited

OTHER PUBLICATIONS

United States Patent and Trademark Office, "Final Office Action," issued in connection with U.S. Appl. No. 10/744,921, on May 1, 2008 (24 pages).

United States Patent and Trademark Office, "Non-Final Office Action," issued in connection with U.S. Appl. No. 10/744,921, on Aug. 8, 2007 (16 pages).

United States Patent and Trademark Office, "Non-Final Office Action," issued in connection with U.S. Appl. No. 10/744,921, on Jul. 9, 2009 (24 pages).

United States Patent and Trademark Office, "Final Office Action," issued in connection with U.S. Appl. No. 10/744,921, on Mar. 3, 2010 (23 pages).

United States Patent and Trademark Office, "Notice of Panel Decision from Pre-Appeal Brief Review," issued in connection with U.S. Appl. No. 10/744,921, on Sep. 7, 2010 (2 pages).

United States Patent and Trademark Office, "Non-Final Office Action," issued in connection with U.S. Appl. No. 10/744,921, on May 11, 2011 (20 pages).

United States Patent and Trademark Office, "Notice of Allowance," issued in connection with U.S. Appl. No. 10/744,921, on Apr. 23, 2012 (19 pages).

United States Patent and Trademark Office, "Final Office Action," issued in connection with U.S. Appl. No. 10/745,047, on Mar. 27, 2009 (18 pages).

United States Patent and Trademark Office, "Non-Final Office Action," issued in connection with U.S. Appl. No. 10/745,047, on Jun. 12, 2008 (18 pages).

United States Patent and Trademark Office, "Notice of Allowance," issued in connection with U.S. Appl. No. 10/745,047, on Jul. 23, 2009 (7 pages).

United States Patent and Trademark Office, "Notice of Allowance," issued in connection with U.S. Appl. No. 10/745,116, on Aug. 14, 2009 (7 pages).

United States Patent and Trademark Office, "Notice of Allowance," issued in connection with U.S. Appl. No. 10/745,116, on May 7, 2009 (17 pages).

United States Patent and Trademark Office, "Final Office Action," issued in connection with U.S. Appl. No. 10/745,116, on Apr. 28, 2008 (25 pages).

United States Patent and Trademark Office, "Notice of Allowance," issued in connection with U.S. Appl. No. 10/745,116, on Dec. 3, 2008 (8 pages).

United States Patent and Trademark Office, "Non-Final Office Action," issued in connection with U.S. Appl. No. 10/745,116, on Aug. 7, 2007 (20 pages).

United States Patent and Trademark Office, "Notice of Allowance," issued in connection with U.S. Appl. No. 10/745,117, on May 14, 2009 (30 pages).

United States Patent and Trademark Office, "Non-Final Office Action," issued in connection with U.S. Appl. No. 10/745,117, on Nov. 26, 2008 (21 pages).

United States Patent and Trademark Office, "Final Office Action," issued in connection with U.S. Appl. No. 10/745,117, on May 12, 2008 (15 pages).

United States Patent and Trademark Office, "Non-Final Office Action," issued in connection with U.S. Appl. No. 10/745,117, on Apr. 17, 2008 (15 pages).

United States Patent and Trademark Office, "Non-Final Office Action," issued in connection with U.S. Appl. No. 10/745,117, on Aug. 8, 2007 (14 pages).

United States Patent and Trademark Office, "Supplemental Notice of Allowance," issued in connection with U.S. Appl. No. 10/745,117, on Jun. 15, 2009 (4 pages).

United States Patent and Trademark Office, "Notice of Allowance," issued in connection with U.S. Appl. No. 10/745,117, on Aug. 27, 2009 (7 pages).

United States Patent and Trademark Office, "Non-Final Office Action," issued in connection with U.S. Appl. No. 10/745,168, on Dec. 2, 2008 (25 pages).

United States Patent and Trademark Office, "Final Office Action," issued in connection with U.S. Appl. No. 10/745,168, on May 2, 2008 (21 pages).

United States Patent and Trademark Office, "Final Office Action," issued in connection with U.S. Appl. No. 10/745,168, on Aug. 8, 2007 (17 pages).

United States Patent and Trademark Office, "Notice of Allowance," issued in connection with U.S. Appl. No. 10/745,168, on Jun. 12, 2009 (22 pages).

United States Patent and Trademark Office, "Notice of Allowance," issued in connection with U.S. Appl. No. 10/745,168, on Aug. 7, 2009 (7 pages).

United States Patent and Trademark Office, "Notice of Allowance," issued in connection with U.S. Appl. No. 10/745,170, on Mar. 30, 2012 (7 pages).

United States Patent and Trademark Office, "Notice of Allowance," issued in connection with U.S. Appl. No. 14/286,396, Jul. 17, 2014 (9 pages).

METHODS AND SYSTEMS FOR PROVISIONING LOGICAL CIRCUITS FOR INTERMITTENT USE IN A DATA NETWORK

PRIORITY APPLICATIONS

This patent arises from a continuation of U.S. patent application Ser. No. 13/962,684, filed Aug. 8, 2013, now U.S. Pat. No. 8,670,348, which is a continuation of U.S. patent application Ser. No. 13/690,861, filed Nov. 30, 2012, now U.S. Pat. No. 8,509,118, which is a continuation of U.S. patent application Ser. No. 10/829,539, filed Apr. 22, 2004, now U.S. Pat. No. 8,339,988, all of which are hereby incorporated herein by reference in their entireties.

CROSS-REFERENCE TO RELATED APPLICATIONS

The present application is related to U.S. patent application Ser. No. 10/348,077, entitled "Method and System for Obtaining Logical Performance Data for a Circuit in a Data Network," filed on Jan. 21, 2003, and U.S. patent application Ser. No. 10/348,592, entitled "Method and System for Provisioning and Maintaining a Circuit in a Data Network," filed on Jan. 21, 2003. This application is also related to U.S. patent application Ser. No. 10/829,509, entitled "Method And System For On Demand Selective Rerouting Of Logical Circuit Data In A Data Network," filed on Apr. 22, 2004. All of the above-referenced applications are assigned to the same assignee as the present application and are expressly incorporated herein by reference.

TECHNICAL FIELD

The present invention relates to the routing of data using logical circuits in a data network. More particularly, the present invention is related to provisioning logical circuits for intermittent use in a data network.

BACKGROUND

Data networks contain various network devices, such as switches, for sending and receiving data between two locations. For example, frame relay and Asynchronous Transfer Mode ("ATM") networks contain interconnected network devices that allow data packets or cells to be channeled over a circuit through the network from a host device to a remote device. For a given network circuit, the data from a host device is delivered to the network through a physical circuit such as a T1 line that links to a switch of the network. The remote device that communicates with the host through the network also has a physical circuit to a switch of the network. A network circuit also includes a logical circuit which includes a variable communication path for data between the switches associated with the host and the remote device.

In large-scale networks, the host and remote end devices of a network circuit may be connected across different local access and transport areas ("LATAs") which may in turn be connected to one or more Inter-Exchange Carriers ("IEC") for transporting data between the LATAs. These connections are made through physical trunk circuits utilizing fixed logical connections known as Network-to-Network Interfaces ("NNIs"). Logical circuits in these networks are typically known as Permanent Virtual Circuits or PVCs because of the permanent or fixed logical connections between LATAs and IECs.

Customers of frame relay, ATM, or other data networks are typically required to purchase logical circuits or PVCs for continuous use even if the customer only uses the circuits on an intermittent basis. For example, a customer based in Florida may utilize one frame relay PVC for continuously sending data between various customer locations in Florida and another PVC for periodically sending payroll data (e.g., every second Thursday between 1 P.M. and 3 P.M.) to a customer location in North Carolina. The customer would be required to purchase two frame relay PVCs for continuous use even though one circuit would only be used by the customer on an intermittent basis.

It is with respect to these considerations and others that the present invention has been made.

SUMMARY

In accordance with the present invention, the above and other problems are solved by methods and a system for provisioning logical circuits for intermittent use in a data network. One method includes receiving at least one customer order for routing data in the data network for a predetermined time period, provisioning a logical circuit in the data network for routing the customer data during the predetermined time period, and deleting the logical circuit at the end of the predetermined time period. The method may further include provisioning the logical circuit prior to the start of the predetermined time period. The logical circuit may be provisioned during a maintenance window in the data network which occurs prior to the predetermined time period. The logical circuit may be deleted during a maintenance window following the end of the predetermined time period.

The method may further include generating trap data including utilization statistics for the logical circuit during the predetermined time period. The utilization statistics may include the percent utilization of the at least one logical circuit during the predetermined time period. The customer order may include one or more quality of service parameters for the logical circuit. The logical circuit may be either a permanent virtual circuit ("PVC") or a switched virtual circuit ("SVC"). The data network may be either a frame relay network or an asynchronous transfer mode ("ATM") network.

According to another aspect of the invention, a method is provided for provisioning logical circuits for routing logical circuit data in a data network during a predetermined time period. The method includes receiving a customer order for routing the logical data in the data network during the predetermined time period, determining a maintenance window in the data network prior to the start of the predetermined time period, provisioning a logical circuit during the maintenance window, determining a maintenance window in the data network following the end of the predetermined time period, and deleting the logical circuit during the maintenance window.

These and various other features as well as advantages, which characterize the present invention, will be apparent from a reading of the following detailed description and a review of the associated drawings.

DETAILED DESCRIPTION OF THE INVENTION

Figure 1:
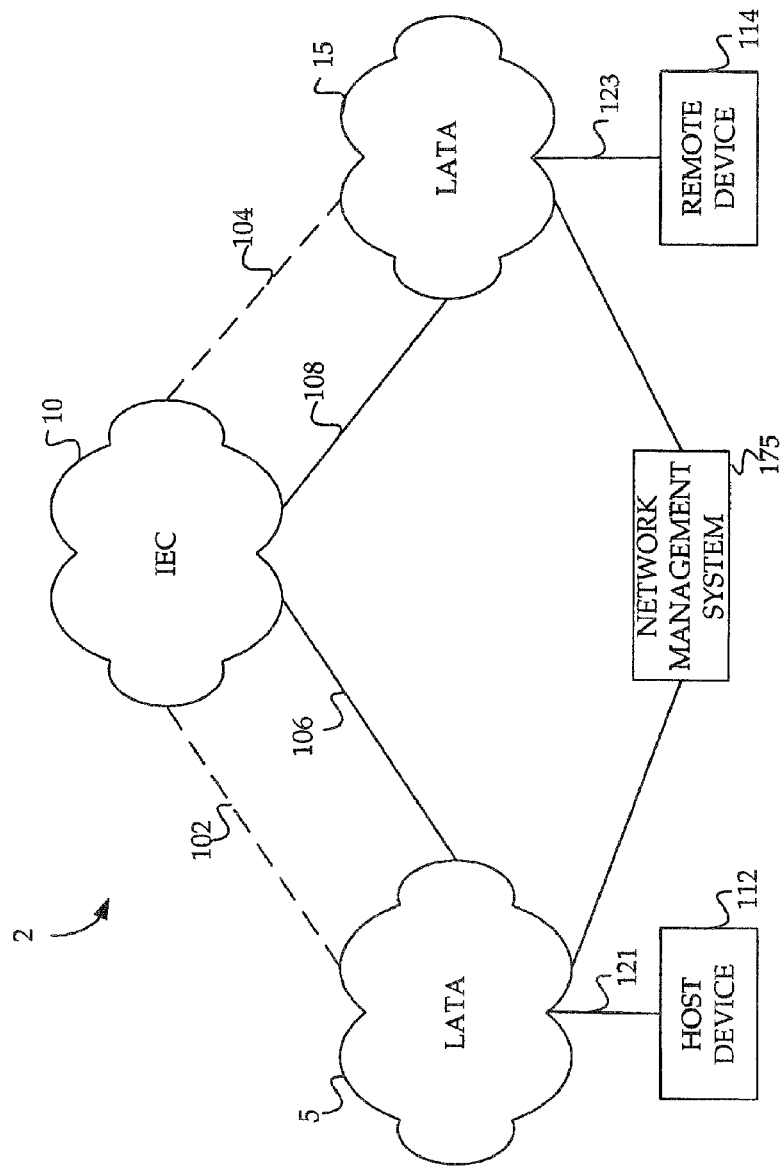
FIG. 1 illustrates a data network according to an embodiment of the invention.

Embodiments of the present invention provide for methods and a system for provisioning logical circuits for intermittent use in a data network. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Embodiments of the present invention may be generally employed in a data network 2 as shown in FIG. 1. The data network 2 includes local access and transport areas ("LATAs") 5 and 15 which are connected by an Inter-Exchange Carrier ("IEC") 10. It should be understood that the LATAs 5 and 15 may be data networks operated by a commonly owned Local Exchange Carrier ("LEC"). It should be further understood that the IEC 10 may include one or more data networks which may be operated by a commonly owned IEC. It will be appreciated by those skilled in the art that the data network 2 may be a frame relay network, asynchronous transfer mode ("ATM") network, or any other network capable of communicating data conforming to Layers 2-4 of the Open Systems Interconnection ("OSI") model developed by the International Standards Organization, incorporated herein by reference. It will be appreciated that these networks may include, but are not limited to, communications protocols conforming to the Multiprotocol Label Switching Standard ("MPLS") networks and the Transmission Control Protocol/Internet Protocol ("TCP/IP"), which are known to those skilled in the art.

The data network 2 includes a network circuit which channels data between a host device 112 and a remote device 114 through the LATA 5, the IEC 10, and the LATA 15. It will be appreciated by those skilled in the art that the host and remote devices 112 and 114 may be local area network ("LAN") routers, LAN bridges, hosts, front end processors, Frame Relay Access Devices ("FRADs"), or any other device with a frame relay, ATM, or network interface. It will be further appreciated that in the data network 2, the LATAs 5 and 15 and the IEC 10 may include network elements (not shown) which support interworking to enable communications between host and remote devices supporting dissimilar protocols. Network elements in a data network supporting interworking may translate frame relay data packets or frames sent from a host FRAD to ATM data packets or cells so that a host device may communicate with a remote device having an ATM interface. The LATAs 5 and 15 and the IEC 10 may further include one or more interconnected network elements, such as switches (not shown), for transmitting data. An illustrative LEC data network will be discussed in greater detail in the description of FIG. 2 below.

The network circuit between the host device 112 and the remote device 114 in the data network 2 includes a physical circuit and a logical circuit. As used in the foregoing description and the appended claims, a physical circuit is defined as the physical path that connects the end point of a network circuit to a network device. For example, the physical circuit of the network circuit between the host device 112 and the remote device 114 includes the physical connection 121 between the host device 112 and the LATA 5, the physical connection 106 between the LATA 5 and the IEC 10, the physical connection 108 between the IEC 10 and the LATA 15, and the physical connection 123 between the LATA 15 and the remote device 114. Routers and switches within the LATAs 5 and 15 and the IEC 10 carry the physical signal between the host and remote end devices 112 and 114 through the physical circuit.

It should be understood that the host and remote devices may be connected to the physical circuit described above using user-to-network interfaces ("UNIs"). As is known to those skilled in the art, an UNI is the physical demarcation point between a user device (e.g., a host device) and a public data network. It will further be understood by those skilled in the art that the physical connections 106 and 108 may include trunk circuits for carrying the data between the LATAs 5 and 15 and the IEC 10. It will be further understood by those skilled in the art that the connections 121 and 123 may be any of various physical communications media for communicating data such as a 56 Kbps line or a T1 line carried over a four-wire shielded cable or over a fiber optic cable.

As used in the foregoing description and the appended claims, a logical circuit is defined as a portion of the network circuit wherein data is sent over variable communication data paths or logical connections established between the first and last network devices within a LATA or IEC network and over fixed communication data paths or logical connections between LATAs (or between IECs). Thus, no matter what path the data takes within each LATA or IEC, the beginning and end of each logical connection between networks will not change. For example, the logical circuit of the network circuit in the data network 2 may include a variable communication path within the LATA 5 and a fixed communication path (i.e., the logical connection 102) between the LATA 5 and the IEC 10. It will be understood by those skilled in the art that the logical connections 102 and 104 in the data network 2 may include network-to-network interfaces ("NNIs") between the last sending switch in a LATA and the first receiving switch in an IEC.

As is known to those skilled in the art, each logical circuit in a data network may be identified by a unique logical identifier. In frame relay networks, the logical identifier is called a Data Link Connection Identifier ("DLCI") while in ATM networks the logical identifier is called a Virtual Path Identifier/Virtual Circuit Identifier ("VPI/VCI"). In frame relay networks, the DLCI is a 10-bit address field contained in the header of each data frame and contains identifying information for the logical circuit as well as information relating to the destination of the data in the frame, quality of service ("QoS") parameters, and other service parameters for handling network congestion. For example, in the data network 2 implemented as a frame relay network, the designation DLCI 100 may be used to identify the logical circuit between the host device 112 and the remote device 114. It will be appreciated that in data networks in which logical circuit data is communicated through more than one carrier (e.g., an LEC and an IEC) the DLCI designation for the logical circuit may change in a specific carrier's network. For example, in the data network 2, the designation DLCI 100 may identify the logical circuit in the LATA 5 and LATA 15 but the designation DLCI 800 may identify the logical circuit in the IEC 10.

Illustrative QoS parameters which may be included in the DLCI include a Variable Frame Rate ("VFR") real time parameter and a VFR non-real time parameter. As is known to those skilled in the art, VFR real time is a variable data rate for frame relay data frames communicated over a logical circuit. Typically, VFR real-time circuits are able to tolerate small variations in the transmission rate of data (i.e., delay) and small losses of frames. Typical applications for VFR real time circuits may include, but are not limited to, voice and some types of interactive video. VFR non-real time circuits also communicate data frames at a variable data rate but are able to tolerate higher variations in the transmission rate and thus more delay as these circuits are typically "bursty" (i.e., data is transmitted in short, uneven spurts) in nature. Typical applications for VFR non-real time circuits include, but are not limited to, inter-LAN communications and Internet traffic.

Other service parameters which may be included in the DLCI include a Committed Information Rate ("CIR") parameter and a Committed Burst Size ("Bc") parameter. As is known to those skilled in the art, the CIR represents the average capacity of the logical circuit and the Bc represents the maximum amount of data that may be transmitted. It will be appreciated that the logical circuit may be provisioned such that when the CIR or the Bc is exceeded, the receiving switch in the data network will discard the frame. It should be understood that the logical circuit parameters are not limited to CIR and Bc and that other parameters known to those skilled in the art may also be provisioned, including, but not limited to, Burst Excess Size ("Be") and Committed Rate Measurement Interval ("Tc").

In ATM networks, the VPI/VCI is an address field contained in the header of each ATM data cell and contains identifying information for the logical circuit as well as information specifying a data cell's destination, QoS parameters, and specific bits which may indicate, for example, the existence of congestion in the network and a threshold for discarding cells. Illustrative QoS parameters which may be included in the VPI/VCI include a Committed Bit Rate ("CBR") parameter, a Variable Bit Rate ("VBR") parameter, and an Unspecified Bit Rate ("UBR") parameter. As is known to those skilled in the art, CBR defines a constant data rate for ATM cells communicated over a logical circuit. Typically, CBR circuits are given the highest priority in a data network and are very intolerant to delay. Typical applications for CBR circuits may include, but are not limited to, video conferencing, voice, television and video-on demand. VBR circuits communicate ATM cells at a variable data rate and are able to tolerate varying degrees of delay. Similar to frame relay variable service parameters, VBR circuits may be further subdivided into VBR real time and VBR non-real time. VBR non-real time circuits are able to tolerate more delay. Typical applications for ATM VBR circuits may include the same applications as frame relay VFR circuits. UBR circuits communicate ATM cells at an unspecified bit rate and are extremely tolerant to delay. UBR circuits are typically reserved for non-time sensitive applications such as file transfer, email, and message and image retrieval.

It should be understood that the logical circuit in the data network 2 may be a permanent virtual circuit ("PVC") available to the network at all times or a temporary or a switched virtual circuit ("SVC") available to the network only as long as data is being transmitted. It should be understood that the data network 2 may further include additional switches or other interconnected network elements (not shown) creating multiple paths within each LATA and IEC for defining each PVC or SVC in the data network. It will be appreciated that the data communicated over the logical connections 102 and 104 may be physically carried by the physical connections 106 and 108.

The data network 2 may also include a failover network for rerouting logical circuit data, according to an embodiment of the invention. The failover network may include a network failover circuit including physical connections and logical connections for rerouting logical circuit data in the event of a failure in the network circuit between the host device 112 and the remote device 114. The failover network will be described in greater detail in the description of FIG. 4 below. The data network 2 may also include a network management system 175 in communication with the LATA 5, the LATA 15, and the failover network. The network management system 175 may be utilized to obtain status information for the logical and physical circuit between the host device 112 and the remote device 114. The network management system 175 may also be utilized for rerouting logical data in the data network 2 between the host device 112 and the remote device 114. The network management system 175 will be discussed in greater detail in the description of FIG. 3 below.

Figure 2:
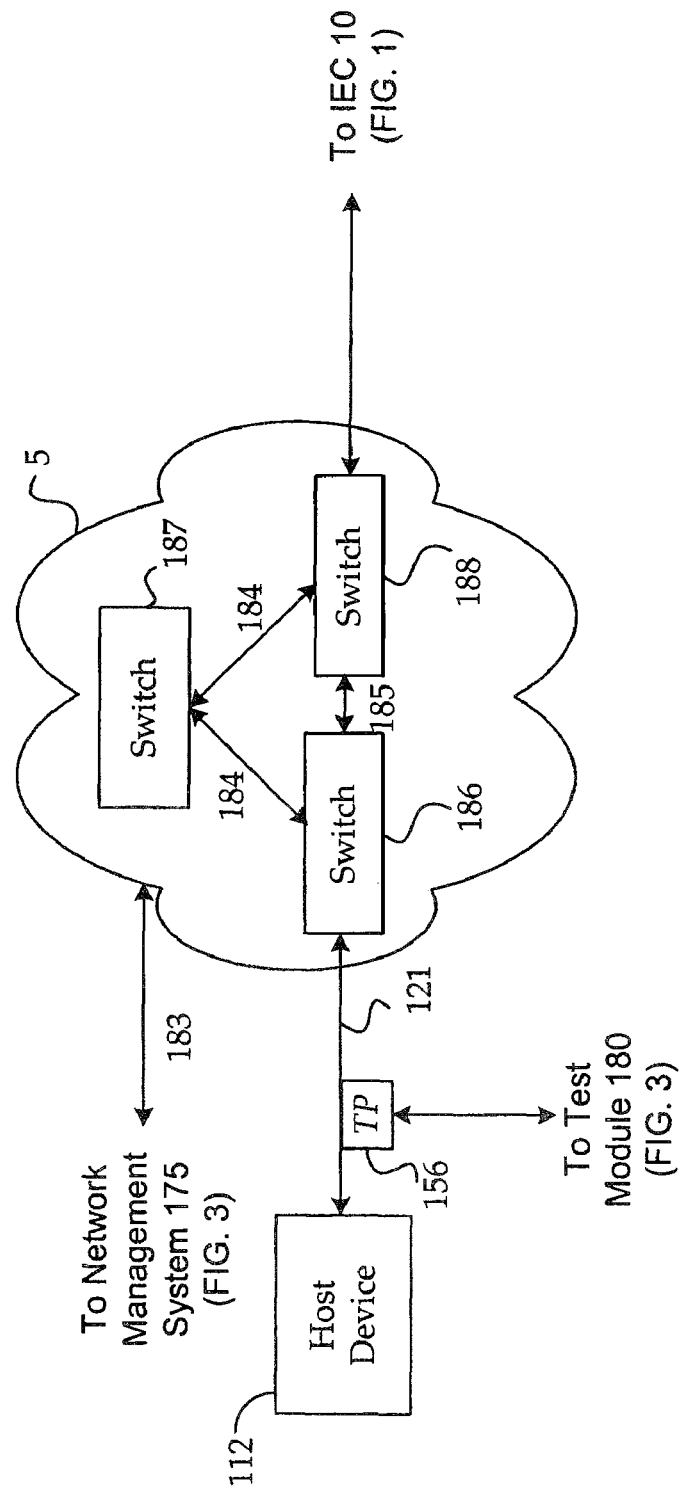
FIG. 2 illustrates a local access and transport area ("LATA") in the data network of FIG. 1, according to an embodiment of the invention.

FIG. 2 illustrates the LATA 5 in the data network 2 described in FIG. 1 above, according to an embodiment of the present invention. As shown in FIG. 2, the LATA 5 includes interconnected network devices such as switches 186, 187, and 188. It will be appreciated that the data network 2 may also contain other interconnected network devices and elements (not shown) such as digital access and cross connect switches ("DACS"), channel service units ("CSUs"), and data service units ("DSUs"). As discussed above in the description of FIG. 1, the connection data paths of a logical circuit within a data network may vary between the first and last network devices in a data network. For example, as shown in FIG. 2, the logical circuit in the LATA 5 may include the communication path 185 between the switches 186 and 188 or the communication path 184 between the switches 186, 187, and 188. As discussed above, it should be understood that the actual path taken by data through the LATA 5 is not fixed and may vary from time to time, such as when automatic rerouting takes place.

It will be appreciated that the switches 186, 187, and 188 may include a signaling mechanism for monitoring and signaling the status of the logical circuit in the data network 2. Each time a change in the status of the logical circuit is detected (e.g., a receiving switch begins dropping frames), the switch generates an alarm or "trap" which may then be communicated to a management station, such as a logical element module (described in detail in the description of FIG. 3 below), in the network management system 175. In one embodiment, the signaling mechanism may be in accord with a Local Management Interface ("LMI") specification, which provides for the sending and receiving of "status inquiries" between a data network and a host or remote device. The LMI specification includes obtaining status information through the use of special management frames (in frame relay networks) or cells (in ATM networks). In frame relay networks, for example, the special management frames monitor the status of logical connections and provide information regarding the health of the network. In the data network 2, the host and remote devices 112 and 114 receive status information from the individual LATAs they are connected to in response to a status request sent in a special management frame or cell. The LMI status information may include, for example, whether or not the logical circuit is congested or whether or not the logical circuit has failed. It should be understood that the parameters and the signaling mechanism discussed above are optional and that other parameters and mechanisms may also be utilized to obtain connection status information for a logical circuit.

Figure 3:
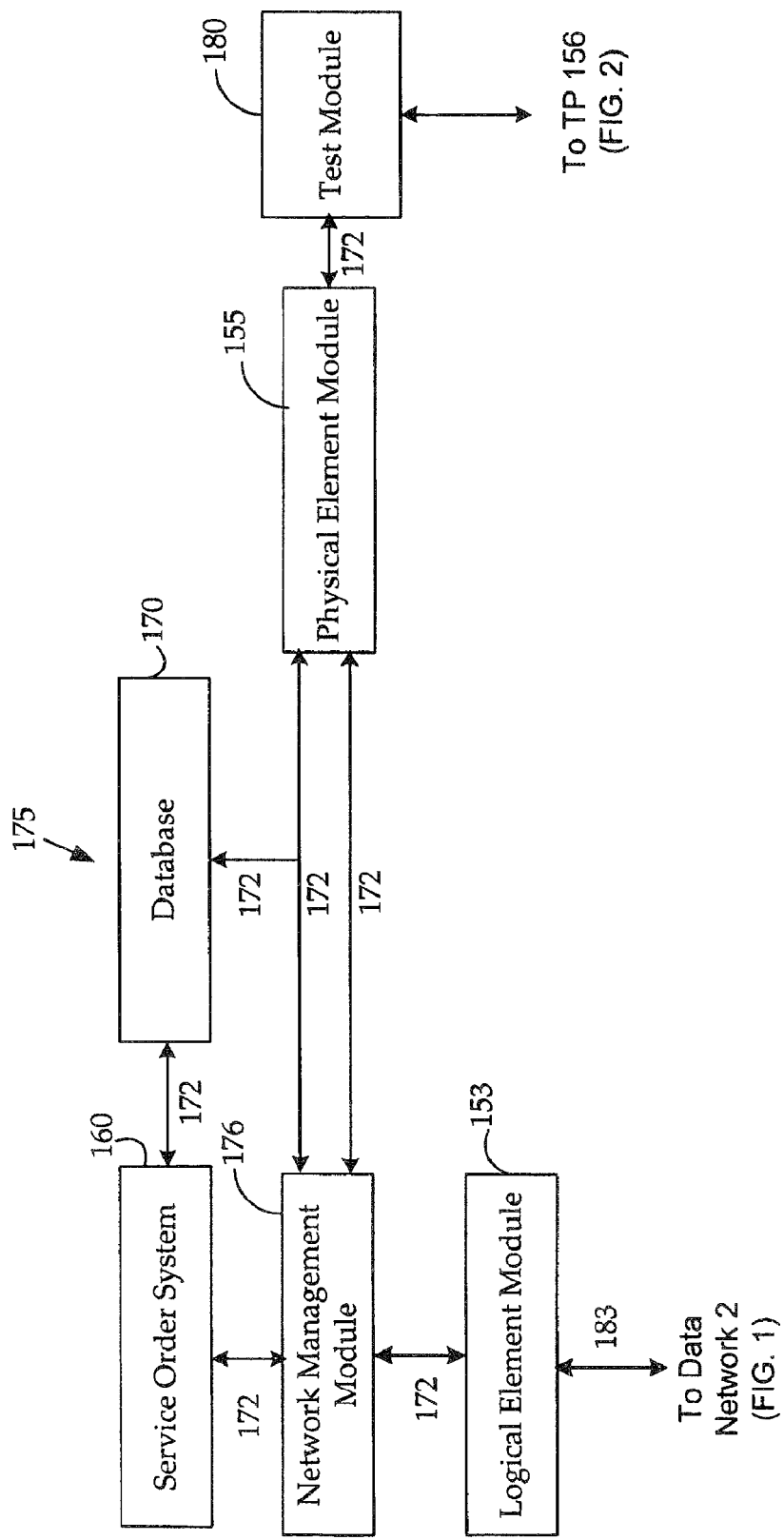
FIG. 3 illustrates a network management system which may be utilized to provision logical circuits for intermittent use in the data network of FIG. 1, according to an embodiment of the invention.

FIG. 3 illustrates the network management system 175 which may be utilized to provision logical circuits for intermittent use in the data network of FIG. 1, according to an embodiment of the invention. The network management system 175 includes a service order system 160, a network database 170, a logical element module 153, a physical element module 155, a network management module 176, and a test module 180. The service order system 160 is utilized in the data network 2 for receiving service orders for provisioning network circuits. The service order includes information defining the transmission characteristics (i.e., the logical circuit) of the network circuit. The service order also contains the access speed, CIR, burst rates, and excess burst rates. The service order system 160 communicates the service order information to a network database 170 over management trunk 172. The network database 170 assigns and stores the parameters for the physical circuit for the network circuit such as a port number on the switch 186 for transmitting data over the physical connection 121 to and from the host device 112.

The network database 170 may also be in communication with an operations support system (not shown) for assigning physical equipment to the network circuit and for maintaining an inventory of the physical assignments for the network circuit. An illustrative operations support system is "TIRKS"® (Trunks Integrated Records Keeping System) marketed by TELECORDIA™ TECHNOLOGIES, Inc. of Morristown, N.J. The network database 170 may also be in communication with a Work Force Administration and Control system ("WFA/C") (not shown) used to assign resources (i.e., technicians) to work on installing the physical circuit.

The network management system 175 also includes the logical element module 153 which is in communication with the switches in the data network 2 through management trunks 183. The logical element module 153 runs a network management application program to monitor the operation of logical circuits which includes receiving trap data generated by the switches which indicate the status of logical connections. The trap data may be stored in the logical element module 153 for later analysis and review. The logical element module 153 is also in communication with the network database 170 via management trunks 172 for accessing information stored in the network database 170 regarding logical circuits, such as the logical circuit identifier data. In an alternative embodiment, the logical element module 153 may also be utilized to store the logical circuit identifier data. The logical circuit identifier data may include, for example, the DLCI or VPI/VCI header information for each data frame or cell in the logical circuit including the circuit's destination and service parameters. The logical element module 153 may consist of terminals (not shown) that display a map-based graphical user interface ("GUI") of the logical connections in the data network. An illustrative logical element module is the NAVISCORE™ system marketed by LUCENT TECHNOLOGIES, Inc. of Murray Hill, N.J.

The network management system 175 further includes the physical element module 155 in communication with the physical connections of the network circuit via management trunks (not shown). The physical element module 155 runs a network management application program to monitor the operation and retrieve data regarding the operation of the physical circuit. The physical element module 155 is also in communication with the network database 170 via management trunks 172 for accessing information regarding physical circuits, such as line speed. Similar to the logical element module 153, the physical logical element module 155 may also consist of terminals (not shown) that display a map-based GUI of the physical connections in the LATA 5. An illustrative physical element module is the Integrated Testing and Analysis System ("INTAS"), marketed by TELECORDIA™ TECHNOLOGIES, Inc. of Morristown, N.J., which provides flow-through testing and analysis of telephony services.

The physical element module 155 troubleshoots the physical connections for a physical circuit by communicating with test module 180, which interfaces with the physical connections via test access point 156. The test module 180 obtains the status of the physical circuit by transmitting "clean" test signals to test access point 156 (shown in FIG. 2) which "loops back" the signals for detection by the test module 180. It should be understood that there may be multiple test access points on each of the physical connections for the physical circuit.

The network management system 175 further includes the network management module 176 which is in communication with the service order system 160, the network database 170, the logical element module 153, and the physical element module 155 through communications channels 172. It should be understood that in one embodiment, the network management system 175 may also be in communication with the LATA 15, the IEC 10, and the failover network. The communications channels 172 may be on a LAN. The network management module 176 may consist of terminals (not shown), which may be part of a general-purpose computer system that displays a map-based GUI of the logical connections in data networks. The network management module 176 may communicate with the logical element module 153 and the physical element module 155 using a Common Object Request Broker Architecture ("CORBA"). As is known to those skilled in the art, CORBA is an open, vendor-independent architecture and infrastructure which allows different computer applications to work together over one or more networks using a basic set of commands and responses. The network management module 176 may also serve as an interface for implementing logical operations to provision and maintain network circuits. The logical operations may be implemented as machine instructions stored locally or as instructions retrieved from the logical and physical element modules 153 and 155. An illustrative method detailing the provisioning and maintenance of network circuits in a data network is presented in U.S. patent application Ser. No. 10/348,592, entitled "Method And System For Provisioning And Maintaining A Circuit In A Data Network," filed on Jan. 23, 2003, and assigned to the same assignee as this application, which is expressly incorporated herein by reference (incorporated below and in corresponding drawings in connection with FIGS. 5-7). An illustrative network management module is the Broadband Network Management System® ("BBNMS") marketed by TELECORDIA™ TECHNOLOGIES, Inc. of Morristown, N.J.

The network management module 176 may also serve as an interface with the logical element module 153 to receive and store trap data indicating the status of the logical connections comprising logical circuits in the data network 2. It will be appreciated that the network management module 176 may further be configured to compile historical statistics for logical circuits based on an analysis of stored trap data. These historical statistics may include, for example, the utilization of logical circuits (i.e., the extent to which logical circuits are being used) in the data network 2. It will be appreciated that utilization may be represented as a percentage corresponding to logical circuit usage at a given point in time or over a period of time. For example, if a logical circuit supports a T-1 data transmission rate (i.e., 1.544 megabits per second) but, on average, is used to support a data transmission rate of 772 kilobits per second, the logical circuit is only 50% utilized. It will be appreciated that logical circuits with utilizations approaching 100% may suffer congestion some percentage of the time. This may occur, for example, when the maximum data transmission rate (e.g., the Committed Burst Size or Bc) for a logical circuit is maintained over an extended period of time.

Figure 4:
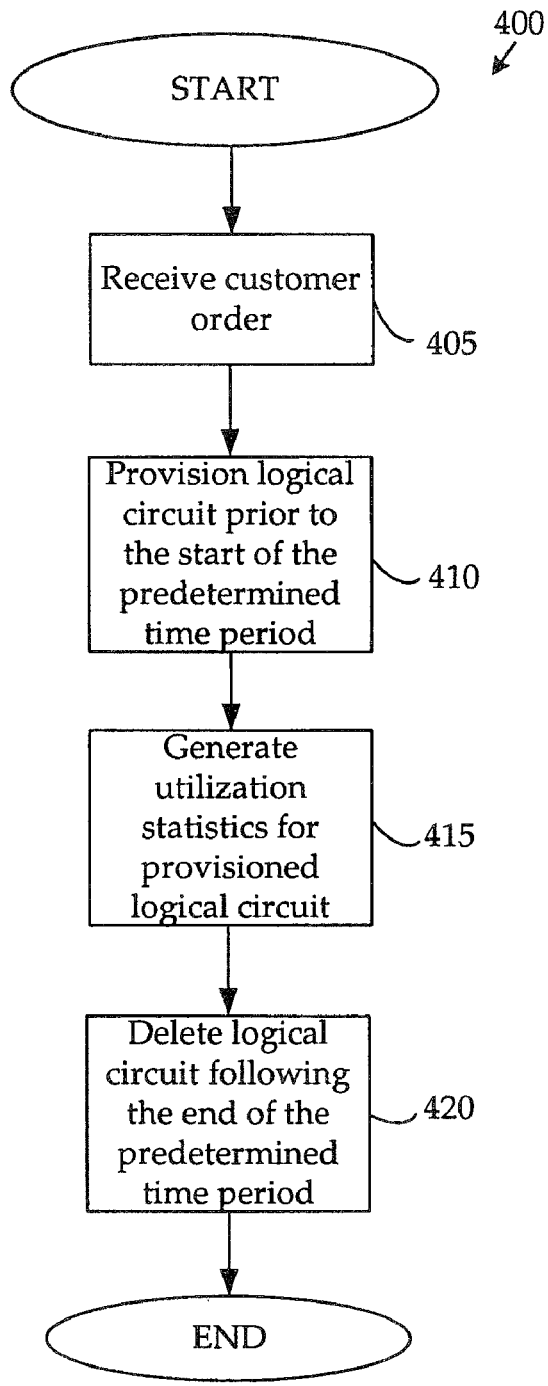
FIG. 4 is a flowchart describing logical operations for provisioning logical circuits for intermittent use in the data network of FIG. 1, according to an embodiment of the invention.

FIG. 4 is a flowchart describing logical operations 400 for provisioning logical circuits for intermittent use in the data network of FIG. 1, according to an embodiment of the invention. The logical operations 400 begin at operation 405 where the network management module 176 receives a customer order for routing data in the data network 2 for a predetermined time period. It will be appreciated that the customer order may be received from the service order system 160 (FIG. 3) which is utilized in the data network 2 for receiving service orders for provisioning network circuits. In addition to the predetermined time period, the customer order may also include a QoS parameter for the logical circuit.

The logical operations 400 then continue from operation 405 to operation 410 where the network management module 176, prior to the start of the predetermined time period, provisions a logical circuit in the data network 2 for communicating data during the predetermined time period. It will be appreciated that in one embodiment, the logical circuit may be provisioned by the network management module 176 in communication with the logical element module 153 and one or more network devices in the data network 2. The network management module 176 communicates logical circuit parameter data from the customer request (such as the circuit's destination, the predetermined time period, and the QoS parameter) to the logical element module 153 which then locates the appropriate network devices, and programming ports on the switches in the data network 2 to create the logical circuit. For example, if a customer order includes a request for a logical circuit between the host device 112 in communication with the LATA 5 and the end device 114 in communication with the LATA 15, logical element module 153 would access and program ports in the network devices 186, 187, and 188 to deliver data from the host device 112 to the remote device 114 by establishing the logical connections 102 and 104 over the physical connections 106 and 108.

It will be appreciated that in one embodiment, the network management module 176 may provision the logical circuit during a maintenance window for provisioning logical circuits in the data network 2 which is prior to the start of the predetermined time period in the customer order. The maintenance window may include a time period during which little data traffic is being communicated in the data network 2. The customer requested logical circuit may be added to a batch of logical circuits to be provisioned in the data network during a maintenance window based on the time the order is received by the network management module 176. For example, a customer order received between 8 A.M. and 2 P.M. may be placed in a batch of logical circuits to be provisioned in the maintenance window beginning at 10 P.M. and ending at 12 A.M. while a customer order received after 2 P.M. may be placed in a batch of logical circuits to be provisioned in the maintenance window beginning at 10 P.M. on the following day. In another embodiment, the network management module 176 may be configured to provision a logical circuit requested in a customer order in real-time. That is, logical circuits are provisioned just prior to the start of the predetermined time period in the customer order. It will be appreciated that real-time provisioning of logical circuits facilitate the fulfilling of customer orders for time periods falling prior to a maintenance window. For example, a customer order made at 8 A.M. requesting a logical circuit between 3 P.M. and 6 P.M. of the same day would be outside of the earliest maintenance window beginning at 10 P.M. and so would not be fulfilled without real-time processing.

The logical operations 400 continue from operation 410 to operation 415 where the network management module 176 generates utilization statistics for the provisioned logical circuit during the predetermined time period. As discussed above with respect to FIG. 3, the network management module 176 receives and stores trap data from the logical element module 153 indicating the status of the logical connections comprising logical circuits in the data network 2. The network management module 176 may further be configured to present the utilization statistics to the customer. In one embodiment, the utilization statistics may be presented to the customer in a table via a visual display or map generated by the network management module 176. An illustrative system detailing the generation and presentation of utilization statistics by the network management module 176 is presented in U.S. patent application Ser. No. 10/829,509, entitled "Method And System For On Demand Selective Rerouting Of Logical Circuit Data In A Data Network," filed on Apr. 22, 2004, and assigned to the same assignee as this application, which is expressly incorporated herein by reference.

The logical operations 400 then continue from operation 415 to operation 420 where the network management module 176 deletes the provisioned logical circuit at the end of the predetermined time period. It will be appreciated that in one embodiment, the logical circuit may be deleted by the network management module 176 in communication with the logical element module 153 and one or more network devices in the data network 2. For example, if a customer order indicates the deletion of a logical circuit between the host device 112 in communication with the LATA 5 and the end device 114 in communication with the LATA 15 after 4 P.M., the logical element module 153 would access and program ports in the network devices 186, 187, and 188 to delete the established logical connections 102 and 104 in the data network 2.

It will be appreciated that in one embodiment, the network management module 176 may delete the logical circuit during a maintenance window which follows the end of the predetermined time period in the customer order. The maintenance window may include a time period during which little data traffic is being communicated in the data network 2. The customer requested logical circuit may be added to a batch of logical circuits to be deleted in the data network during a maintenance window based on the time the order is received by the network management module 176. For example, a customer order received between 8 A.M. and 2 P.M. may be placed in a batch of logical circuits to be deleted in the maintenance window beginning at 10 P.M. and ending at 12 A.M. while a customer order received after 2 P.M. may be placed in a batch of logical circuits to be deleted in the maintenance window beginning at 10 P.M. on the following day. In another embodiment, the network management module 176 may be configured to delete a logical circuit requested in a customer order in real-time. That is, logical circuits are deleted just after the end of the predetermined time period in the customer order. It will be appreciated that real-time deletion of logical circuits will free up network resources utilized for maintaining the logical circuit after the predetermined time period has elapsed but before the next maintenance window. The logical operations 400 then end. It will be appreciated that following the deletion of the logical circuit, the network management system 175 may generate a bill for the customer based on the length of the predetermined time period.

It will be appreciated that the embodiments of the invention described above provide for a method and system for provisioning logical circuits for a predetermined time period for communicating data in a data network. A logical circuit may be provisioned in the data network for communicating customer data for a predetermined time period. Once the predetermined time period has elapsed, the provisioned logical circuit is deleted from the data network. Customers may be charged for the use of the provisioned logical circuit during the predetermined time period.

Figure 5:
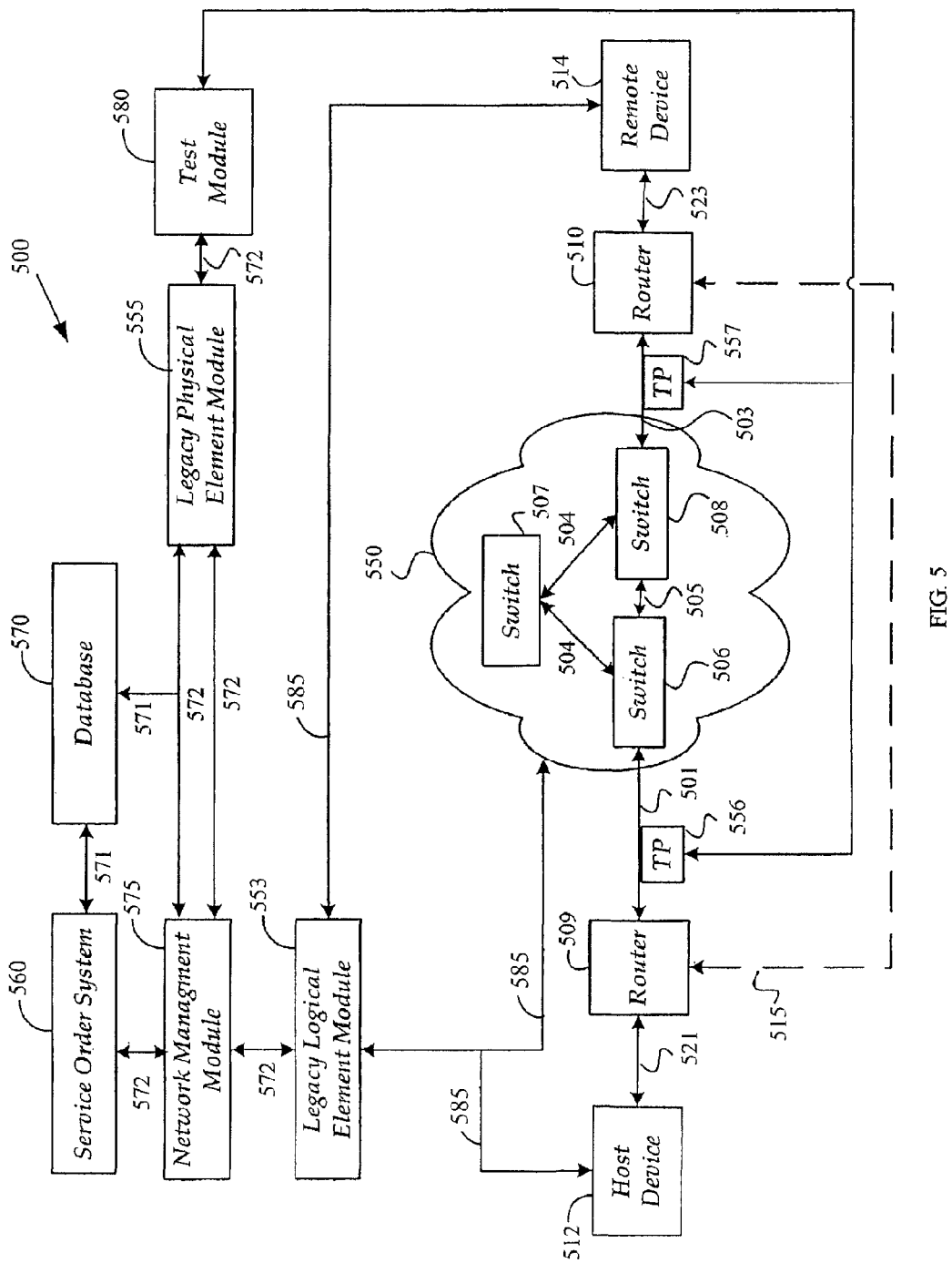
FIG. 5 shows a networked environment including a data network and a management system.

Turning to FIG. 5, the networked environment 500 includes a data network 550, which contains one or more interconnected network elements, such as switches 506, 507, and 508, for transmitting data. The data network 550 may be a frame relay network. In one embodiment, the switches 506, 507, and 508 may be data packet switches. It will be appreciated that the data network may also contain other interconnected network devices and elements (not shown) such as digital access and cross connect switches (DACs), channel service units (CSUs), and data service units (DSUs).

The data network 550 channels data using a network circuit 515 between a host device 512 and a remote device 514. The network circuit 515 includes a physical circuit and a logical circuit. As used in the foregoing description and the appended claims, a physical circuit is defined as the physical path that connects the end point of a network circuit to a network device. For example, in the networked environment 500 of FIG. 5, the physical circuit of the network circuit 515 includes the physical connection 501 between the router 509 and the switch 506 as well as the physical connection 503 between the router 510 and the switch 508. Routers 509 and 510 carry the physical signal from the end devices 512 and 514 over the connections 501 and 503 to the network 550. The routers 509 and 510 are connected to host devices 512 and 514 by links 521 and 523 respectively. The routers 509 and 510 may be local area network (LAN) routers, LAN bridges, hosts, front end processors, Frame Relay Access Devices (FRADs), or any other device with a frame relay or network interface. It should be appreciated that the host devices may be configured to serve as routers (thus eliminating the need for the routers 509 and 510). It should also be appreciated that a single router may be linked to multiple host devices. The physical connections 501 and 503 for the physical circuit may be any physical communications medium such as a 56 Kbps line or T1 line carried over a four-wire shielded cable or over a fiber optic cable.

As used in the foregoing description and the appended claims, a logical circuit is defined as a portion of the network circuit wherein data is sent over a communication data path between the first and last network devices in the data network. For example, in the networked environment 500 of FIG. 5, the logical circuit of the network circuit 515 may include the communication path 504 between the switches 506, 507, and 508 in the data network 550. In one embodiment, the logical path 504 may be a trunk for physically interconnecting the switches 506, 507, and 508. It should be understood that the actual path taken by data through the data network 550 is not fixed and may vary from time to time, such as when automatic rerouting takes place. For example, the logical circuit of the network circuit 515 may include the communication path 505 between the switches 506 and 508. It should be understood that no matter what path the data takes the beginning and end of the logical circuit (i.e., the switches 506 and 508) will not change. It will be appreciated that the data network 550 may contain additional switches or other interconnected network elements creating multiple paths between the switches 506, 507, and 508 defining the logical circuit in the data network. In the data network 550, the logical circuit may be either a permanent virtual circuit (PVC) remaining available to the network at all times or a temporary or switched virtual circuit (SVC) available to the network only as long as data is being transmitted.

In the networked environment 500, the network circuit 515 is established between the router 509 and the router 510 by channeling data packets or frames through the data network 550. In frame relay networks, each data frame sent from the host device 512 and the remote device 514 includes a header containing information, called a data link connection identifier (DLCI) which specifies the frame's destination, along with data. The header also includes specific bits for indicating the existence of congestion in the network and for discarding frames. In one embodiment, the logical circuit in the networked environment 500 may be provisioned with parameters for handling network congestion. These parameters may include a Committed Information Rate (CIR) and a Committed Burst Size (Bc). As is known to those skilled in the art, the CIR represents the average capacity of the logical circuit and the Bc represents the maximum amount of data that may be transmitted. The logical circuit may be provisioned such that when the CIR or the Bc is exceeded, the frame will be discarded by the receiving switch in the data network. It will be appreciated that the parameters for the logical circuit are not limited to the CIR and the Be and that other parameters may be provisioned which are known to those skilled in the art. It should be understood that the embodiments of the present invention are not limited to frame relay networks but may also be implemented in other types of data networks such as asynchronous transfer mode (ATM) and native-mode local area networks.

The networked environment 500 may also include a signaling mechanism for determining the status of the logical circuit in the data network 550. In a frame relay network, the signaling mechanism may be in accord with a Local Management Interface (LMI) specification which provides for the sending and receiving of "status inquiries" between the network and an access device. The LMI specification includes obtaining status information through the use of special management frames with a unique DLCI address which may be passed between the network and the access device. These frames monitor the status of the connection and provide information regarding the health of the network. For example in the data network 550, the router 509 receives status information from the switch 506 in response to a status request sent in a special management frame. The LMI status information may include whether or not the logical circuit is congested or whether or not the network circuit is down. It should be understood that the parameters and the signaling mechanism discussed above are optional and that other parameters and mechanisms may also be utilized to obtain connection status information for a network circuit.

The networked environment 500 includes a service order system 560 for receiving service orders for provisioning network circuits. The service order includes information defining the transmission characteristics (i.e., the logical circuit) of the network circuit. The service order also contains the access speed, CIR, burst rates, and excess burst rates. The service order system 560 communicates the service order information to a network database 570 over management trunk 571. The network database 570 assigns and stores the parameters for the physical circuit for the network circuit such as a port number on the switch 506 for transmitting data over the physical connections 501 and 503 to the host device 512.

The network database 570 may also be in communication with an operations support system (not shown) for assigning physical equipment to the network circuit and for maintaining an inventory of the physical assignments for the network circuit. An illustrative operations support system is "TIRKS"® (Trunks Integrated Records Keeping System) marketed by TELECORDIA™ TECHNOLOGIES, Inc. of Morristown, N.J. The network database 570 may also be in communication with a Work Force Administration and Control system (WFA/C) (not shown) which is used to assign resources (i.e., technicians) to work on installing the physical circuit.

The networked environment 500 also includes a legacy logical element module 553 in communication with the switches 506, 508 and host device 512 and remote devices 514 through management trunks 585. The legacy logical element module 553 runs a network management application program to monitor the operation and retrieve data regarding the operation of the logical circuit established between switch 506 and switch 508 for the network circuit 515. The legacy logical element module may consist of terminals (not shown) that display a map-based graphical user interface (GUI) of the logical connections in the data network. An illustrative legacy logical element module is the NAVISCORE™ system marketed by LUCENT TECHNOLOGIES, Inc. of Murray Hill, N.J.

The networked environment 500 further includes a legacy physical element module 555. The legacy physical element module 555 runs a network management application program to monitor the operation and retrieve data regarding the operation of the physical circuit of the network circuit 515. The legacy physical element module is also in communication with the network database 570 for accessing information regarding physical circuits such as the line speed of the physical circuit. Similar to the legacy logical element module 553, the physical logical element module 555 may also consist of terminals (not shown) that display a map-based graphical user interface (GUI) of the physical connections in the data network. An illustrative physical element module is the Integrated Testing and Analysis System (INTAS), marketed by TELECORDIA™ TECHNOLOGIES, Inc. of Morristown, N.J., which provides flow-through testing and analysis of telephony services.

The legacy physical element module 555 troubleshoots the physical connections 501 and 503 for the physical circuit by communicating with test module 580 which interfaces with the physical connections via test access points 556 and 557. The test module 580 obtains the status of the physical circuit by transmitting "clean" test signals to test access points 556 and 557 which "loopback" the signals for detection by the test module 580. It should be understood that there may be multiple test access points on each of the physical connections 501 and 503 for the physical circuit.

The networked environment further includes a network management module 575 in communication with the service order system 560, the network database 570, the legacy logical element module 553, and the legacy physical element module 555 through communications channels 572. The communications channels 572 may be on a local area network (LAN). The network management module 575 may include a terminal (not shown), which may be a general-purpose computer system with a display screen. The network management module 575 serves as an interface for implementing logical operations to provision and maintain network circuits in the networked environment 500. The logical operations may be implemented as machine instructions stored locally or as instructions retrieved from the legacy element modules 553 and 555. The network management module 575 may communicate with the legacy element management module 553 and the legacy physical element management module 555 using a Common Object Request Broker Architecture (CORBA). As is known to those skilled in the art, CORBA is an open, vendor-independent architecture and infrastructure which allows different computer applications to work together over one or more networks using a basic set of commands and responses. An illustrative routine illustrating the logical operations performed by the network management module 575 to provision and maintain network circuits is described below with reference to FIGS. 6 and 7.

Figure 6:
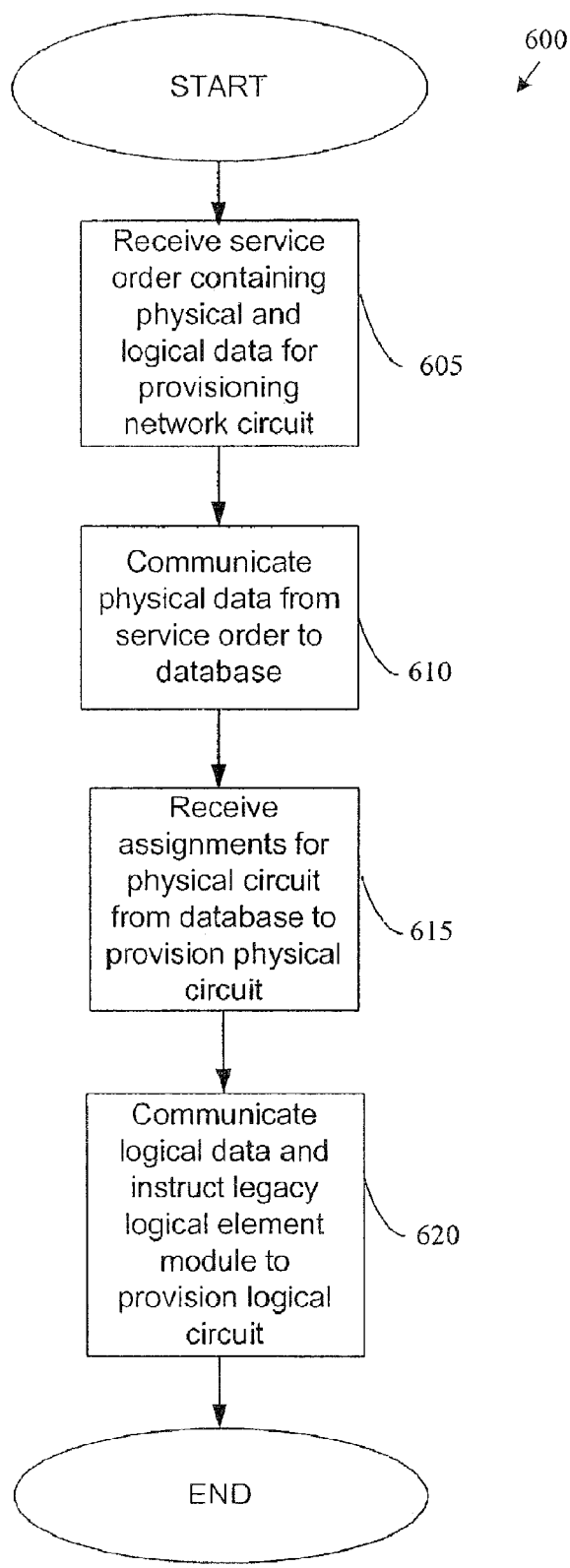
FIG. 6 shows an illustrative routine for provisioning a network circuit in the networked environment shown in FIG. 5.

FIG. 6 shows an illustrative routine for provisioning a network circuit in the networked environment 500. Referring now to FIG. 6, the routine 600 begins at block 605 wherein the network management module 575 receives a service order from the service order system 560 for provisioning a network circuit for a customer, such as network circuit 515. As described above, the service order includes information defining the transmission characteristics of the logical circuit (i.e., access speed, CIR, burst rates, excess burst rates, and DCLI), as well as the physical information needed by downstream systems (i.e., TIRKS and WFA) to assign physical equipment for installing the physical circuit. At block 610, the service order system 560 communicates the physical circuit information to the network database 570 which assigns the parameters for the physical circuit such as the port number on the switch 506 for transmitting data over the physical connections 501 and 503 to the host device 512.

The routine 600 continues to block 615 wherein the network management system 575 receives the assignments for the physical circuit from the network database 570. The network management module 575 then communicates the physical circuit information to a technician who makes the physical connections to establish the physical circuit (i.e., provisions) based on the assignments received from the network database 570.

At block 620, the network management module 575 communicates the logical information from the service order request to the legacy logical element module 553 with instructions to provision the logical circuit. The legacy logical element module 553 provisions the logical circuit by locating the appropriate network devices, and programming ports on the switches in the data network 550 to create the logical circuit. For example, in the networked environment 500, the legacy logical element module 553 would access ports in network device 506, 507, 508 and program the ports to deliver data from the host 512 to the remote device 514 over connection path 505. Thus, the logical circuit for the network circuit 515 is provisioned by the network management module 575 without manual intervention.

Figure 7:
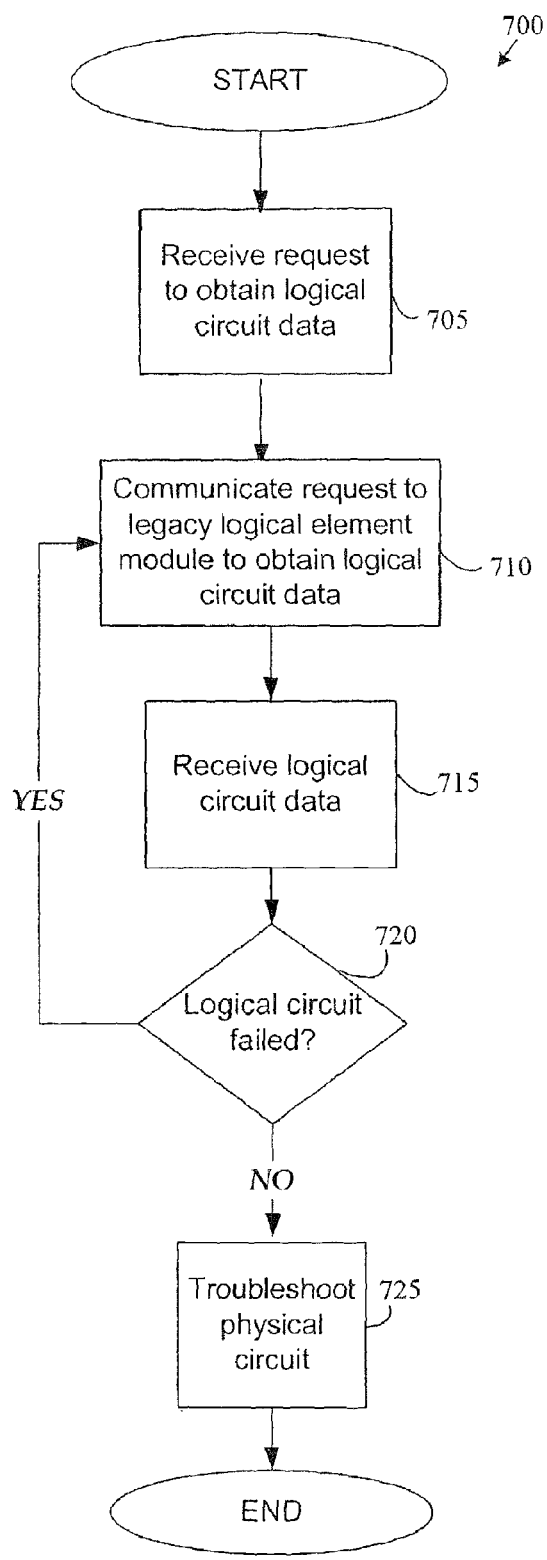
FIG. 7 shows an illustrative routine for performing maintenance on a network circuit in the networked environment shown in FIG. 5.

FIG. 7 shows an illustrative routine method 700 for performing maintenance on the network circuit 515 in the networked environment 500. The routine 700 begins at block 705 wherein, in response to a reported problem, the legacy physical element module 555 obtains the physical circuit information (e.g., port information) from the network database 570 and sends a request to network management module 575 to obtain the logical circuit information for the network circuit 515.

The routine 700 continues to block 710, upon receiving the request from the legacy physical management module 555, the network management module 575 sends a request to the legacy logical element module 553 to obtain logical circuit data, such as the LMI status, for the logical circuit. At block 715, the legacy logical element module 553 retrieves the logical circuit data from a switch, such as switch 506, in the data network 550. The retrieved data may include the aforementioned LMI information as well as the CIR, the Bc, and the DLCI for the logical circuit. The legacy logical element module 553 then communicates the logical circuit data to the network management module 575.

At block 720, the network management module 575 examines the logical circuit data to determine whether or not the logical circuit has failed (i.e., the logical circuit is not transmitting data) so that the legacy physical element module 555 can safely test the network circuit 515 by taking it out of service without losing data. For example, if the LMI information indicates that the logical circuit is congested (i.e., the current access speed exceeds the CIR or the Bc thereby causing frames to be dropped in the data network 550) or if the LMI information indicates that the network circuit 515 is "down" (indicated by the absence of a "keep alive" signal between a router and a switch in the data network), then the network management module 575 will communicate the logical circuit data to the legacy physical element module 555 and instruct the legacy physical element module 555 to test the physical circuit at block 725. The legacy physical element module 555 tests the physical circuit by communicating a request to the test module 580 to access a loop-able test point 556 or 557 on the physical connections 501 or 503. The tests may consist of determining whether the test module 580 can detect a clean signal that it transmits out to the loop-able test point. It will be appreciated that more detailed and advanced testing may also be performed by technicians using tools within the legacy physical element module 555 as well as other tools.

Conversely, if at block 720, the network management module 575 determines that the legacy physical element module 555 can not safely test the network circuit 555 (e.g., the logical circuit is not congested and the network circuit 515 is "up," then the network management module 575 communicates again with the legacy logical element module to determine if another logical circuit in the data network 550 has failed at block 710. As discussed briefly above, the communications between the legacy physical element module 555, the network management module 575, and the legacy logical element module 553 may be implemented using script files containing sets of commands and responses through a CORBA interface.

The network management module 575 enables the legacy physical element module 555 to obtain logical circuit data from the legacy logical element module 553. As a result, technicians at the legacy physical element module 555 are able to use the logical circuit data to troubleshoot network circuits without unnecessarily taking them out of service.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method comprising:
   provisioning a logical circuit for routing data during a time period based on a customer order, wherein provisioning the logical circuit comprises, without manual intervention, provisioning the logical circuit through a first local access and transport area, an inter-exchange carrier, and a second local access and transport area, and wherein the logical circuit includes first variable communication paths to route the data through the first local access and transport area in which the first variable communication paths automatically reroute from first input and output ports of a first set of switches of the first local access and transport area to second input and output ports of a second set of switches of the first local access and transport area while maintaining the logical circuit, second variable communication paths to route the data through the second local access and transport area, and fixed communication paths to route the data between the first local access and transport area, the second local access and transport area, and the inter-exchange carrier, the second set of switches forming a route associated with the first variable communication paths that is not predefined and that is dynamically defined at a time of automatic rerouting of the first variable communication paths; and
   disconnecting the logical circuit following the end of the time period.

2. The method of claim 1, wherein provisioning the logical circuit comprises provisioning the logical circuit prior to the start of the time period.

3. The method of claim 2, wherein provisioning the logical circuit prior to the start of the time period comprises:
   determining a maintenance window prior to the start of the time period; and
   provisioning the logical circuit during the maintenance window.

4. The method of claim 1, wherein disconnecting the logical circuit following the end of the time period comprises:
   determining a maintenance window following the end of the time period; and
   disconnecting the logical circuit during the maintenance window.

5. The method of claim 1, wherein the logical circuit is a permanent virtual circuit.

6. The method of claim 1, wherein the logical circuit is provisioned in a multiprotocol label switching network.

7. An apparatus comprising:
   a processor; and
   a memory to store machine readable instructions that, when executed by the processor, cause the processor to perform operations comprising:
   provisioning a logical circuit for routing data during a time period based on a customer order, wherein provisioning the logical circuit comprises, without manual intervention, provisioning the logical circuit through a first local access and transport area, an inter-exchange carrier, and a second local access and transport area, and wherein the logical circuit includes first variable communication paths to route the data through the first local access and transport area in which the first variable communication paths automatically reroute from first input and output ports of a first set of switches of the first local access and transport area to second input and output ports of a second set of switches of the first local access and transport area while maintaining the logical circuit, second variable communication paths to route the data through the second local access and transport area, and fixed communication paths to route the data between the first local access and transport area, the second local access and transport area, and the inter-exchange carrier, the second set of switches forming a route associated with the first variable communication paths that is not predefined and that is dynamically defined at a time of automatic rerouting of the first variable communication paths; and disconnecting the logical circuit following the end of the time period.

8. The apparatus of claim 7, wherein provisioning the logical circuit comprises provisioning the logical circuit prior to the start of the time period.

9. The apparatus of claim 8, wherein provisioning the logical circuit prior to the start of the time period comprises:

determining a maintenance window prior to the start of the time period; and provisioning the logical circuit during the maintenance window.

10. The apparatus of claim 7, wherein disconnecting the logical circuit following the end of the time period comprises:

determining a maintenance window following the end of the time period; and disconnecting the logical circuit during the maintenance window.

11. The apparatus of claim 7, wherein the logical circuit is a permanent virtual circuit.

12. The apparatus of claim 7, wherein the logical circuit is provisioned in a multiprotocol label switching network.

13. A tangible machine readable storage memory comprising instructions which, when executed, cause a machine to perform a method comprising:

provisioning a logical circuit for routing data during a time period based on a customer order, wherein provisioning the logical circuit comprises, without manual intervention, provisioning the logical circuit through a first local access and transport area, an inter-exchange carrier, and a second local access and transport area, and wherein the logical circuit includes first variable communication paths to route the data through the first local access and transport area in which the first variable communication paths automatically reroute from first input and output ports of a first set of switches of the first local access and transport area to second input and output ports of a second set of switches of the first local access and transport area while maintaining the logical circuit, second variable communication paths to route the data through the second local access and transport area, and fixed communication paths to route the data between the first local access and transport area, the second local access and transport area, and the inter-exchange carrier, the second set of switches forming a route associated with the first variable communication paths that is not predefined and that is dynamically defined at a time of automatic rerouting of the first variable communication paths; and disconnecting the logical circuit following the end of the time period.

14. The tangible machine readable storage memory of claim 13, wherein provisioning the logical circuit comprises provisioning the logical circuit prior to the start of the time period.

15. The tangible machine readable storage memory of claim 14, wherein provisioning the logical circuit prior to the start of the time period comprises:

determining a maintenance window prior to the start of the time period; and provisioning the logical circuit during the maintenance window.

16. The tangible machine readable storage memory of claim 13, wherein disconnecting the logical circuit following the end of the time period comprises:

determining a maintenance window following the end of the time period; and disconnecting the logical circuit during the maintenance window.

17. The tangible machine readable storage memory of claim 13, wherein the logical circuit is a permanent virtual circuit.

18. The tangible machine readable storage memory of claim 13, wherein the logical circuit is provisioned in a multiprotocol label switching network.

* * * * *